US011399651B2

(12) United States Patent
Wu et al.

(10) Patent No.: US 11,399,651 B2
(45) Date of Patent: Aug. 2, 2022

(54) PRESSURE DETECTION DEVICE WITH IMPROVED CONTROL PRECISION OF PRESSURE COOKING APPLIANCE

(71) Applicant: MIDEA GROUP CO., LTD., Foshan (CN)

(72) Inventors: Shuyun Wu, Foshan (CN); Anping Gao, Foshan (CN); Xinjian Huang, Foshan (CN); Guilin Xiong, Foshan (CN)

(*) Notice: Subject to any disclaimer, the term of this patent is extended or adjusted under 35 U.S.C. 154(b) by 649 days.

(21) Appl. No.: 16/338,009

(22) PCT Filed: Dec. 27, 2016

(86) PCT No.: PCT/CN2016/112443
§ 371 (c)(1),
(2) Date: Mar. 29, 2019

(87) PCT Pub. No.: WO2018/107522
PCT Pub. Date: Jun. 21, 2018

(65) Prior Publication Data
US 2020/0022525 A1    Jan. 23, 2020

(30) Foreign Application Priority Data

Dec. 13, 2016    (CN) .......................... 201611146470.4
Dec. 13, 2016    (CN) .......................... 201611146829.8
Dec. 13, 2016    (CN) .......................... 201611147655.7

(51) Int. Cl.
G01L 9/12    (2006.01)
A47J 27/09    (2006.01)
(52) U.S. Cl.
CPC ................. *A47J 27/09* (2013.01); *G01L 9/12* (2013.01)

(58) Field of Classification Search
None
See application file for complete search history.

(56) References Cited

U.S. PATENT DOCUMENTS 7,146,861 B1 * 12/2006 Cook ...................... G01L 9/008
73/753

FOREIGN PATENT DOCUMENTS

CN    101099635 A    1/2008
CN    101620418 A    1/2010
(Continued)

OTHER PUBLICATIONS

OA for EP application 16923813.6.
(Continued)

*Primary Examiner* — Brandi N Hopkins
*Assistant Examiner* — Nigel H Plumb
(74) *Attorney, Agent, or Firm* — Kilpatrick Townsend & Stockton, LLP

(57) ABSTRACT

Disclosed is a pressure detection device configured to detect pressure intensity in a sealed cavity of a cooking appliance, comprising: a pressure sensing assembly comprising a fixed part and a movable part, in which the movable part moves relative to the fixed part when a pressure change in the sealed cavity is sensed, so as to cause a sensing parameter of the pressure sensing assembly to change; and a detecting unit connecting with the pressure sensing assembly and can acquire the pressure intensity in the sealed cavity according to a current sensing parameter of the pressure sensing assembly. The pressure sensing assembly further comprises a flexible sealing sheet disposed at an open end of the body portion to seal the open end, and configured to be deformed towards the pressure chamber when an air pressure in the sealed cavity is greater than an air pressure in the pressure chamber.

19 Claims, 15 Drawing Sheets

(56) References Cited

FOREIGN PATENT DOCUMENTS

| | | |
|---|---|---|
| CN | 201859032 U | 6/2011 |
| CN | 201987350 U | 9/2011 |
| CN | 202069433 U | 12/2011 |
| CN | 102519654 A | 6/2012 |
| CN | 102519659 A | 6/2012 |
| CN | 202386484 U | 8/2012 |
| CN | 203789698 U | 8/2014 |
| CN | 105125069 A | 12/2015 |
| CN | 105286498 A | 2/2016 |
| CN | 205642706 U | 10/2016 |
| JP | 2000262402 A | 9/2000 |

OTHER PUBLICATIONS

The Office Action of KR Application No. 10-2019-7009194.
The first Office Action of CN Application No. 201611146829.8.
The first Office Action of CN Application No. 201611147655.7.

* cited by examiner

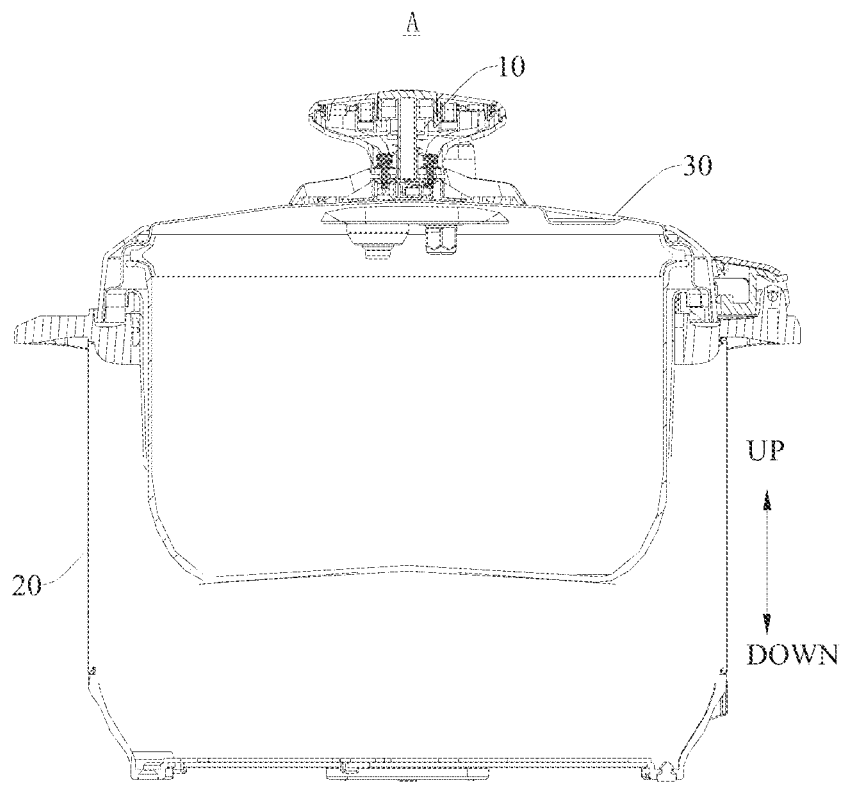

Fig. 34

Converting the pressure value in the pressure cooker into the electrical signal by the sensing component in the cooker lid Detecting the coupling parameter of the coupling component and calculating the pressure intensity in the pressure cooker according to the coupling parameter by the control circuit board

Fig. 35

Converting the pressure value in the pressure cooker into the electrical signal by the sensing component in the cooker lid Detecting the coupling parameter of the coupling component and calculating the pressure intensity in the pressure cooker according to the coupling parameter by the control circuit board Controlling the power supply to be cut off when the control circuit board detects that the coupling parameter exceeds the predetermined value and abruptly changes

Fig. 36

PRESSURE DETECTION DEVICE WITH IMPROVED CONTROL PRECISION OF PRESSURE COOKING APPLIANCE

CROSS-REFERENCES TO RELATED APPLICATIONS

The present application is a national phase application of International Application No. PCT/CN2016/112443, filed on Dec. 27, 2016, which claims the priorities to Chinese Applications No. 201611146470.4, 201611147655.7, and 201611146829.8, filed at Chinese Patent Office on Dec. 13, 2016, and entitled "PRESSURE DETECTION DEVICE AND COOKING APPLIANCE HAVING SAME", the entire contents of which are herein incorporated by reference.

FIELD

The present application relates to a field of household appliances, more particularly to a pressure detection device and a cooking appliance having the same.

BACKGROUND

At present, pressure sensors used in a pressure cooker include resistance strain gauge pressure sensors, semiconductor strain gauge pressure sensors, piezoresistive pressure sensors, inductive pressure sensors, capacitive pressure sensors and so on. These pressure sensors have complicated wire connection, which affects the assembly of a pressure cooker lid and a pot body.

SUMMARY

The present application aims to solve one of the above technical problems at least to some extent.

To this end, the present application proposes a pressure detection device. The pressure detection device has a simple and compact structure with simple wire connection, is convenient to assemble or disassemble, and is particularly suitable for a pressure cooking appliance having a cooker lid and a cooker body separable with each other, thereby simplifying the assembly of the cooker lid and the cooker body.

The present application further proposes a cooking appliance having the above pressure detection device.

For the pressure detection device according to embodiments of a first aspect of the present application, the pressure detection device is configured to detect pressure intensity in a sealed cavity. The pressure detection device includes: a pressure sensing assembly including a fixed part and a movable part, in which the movable part is configured to move relative to the fixed part when a pressure change in the sealed cavity is sensed, so as to cause a sensing parameter of the pressure sensing assembly to change; and a detection unit connected with the pressure sensing assembly, and configured to acquire the pressure intensity in the sealed cavity according to a current sensing parameter of the pressure sensing assembly.

The pressure detection device according to embodiments of the present application has the simple and compact structure with simple wire connection, is convenient to assemble or disassemble, and simplifies the structure and assembly procedure of its installation carrier; moreover, the pressure detection device 10 can detect a pressure value in an application condition to ensure normal operation of the system, safe and reliable use, and better user experience.

In addition, the pressure detection device according to embodiments of the present application can have the following additional technical features.

According to an embodiment of the present application, the sealed cavity is defined by a lid and a housing. The detection unit includes: a first coupling coil disposed in the lid; and a second coupling coil disposed in the housing and wirelessly coupled with the first coupling coil. One of the second coupling coil and the first coupling coil is connected with the pressure sensing assembly.

According to an embodiment of the present application, the fixed part includes a first coil, the movable part includes a movable magnetic core, and the movable magnetic core is configured to move relative to the first coil when the pressure change is sensed, so as to cause an inductance value of the first coil to change.

According to an embodiment of the present application, the detection unit includes: a first capacitor connected in parallel with the first coil to constitute a first resonant circuit; a first induction coil serving as the first coupling coil, and connected in parallel or in series with the first coil in the first resonant circuit; and a first detection assembly configured to detect a resonant frequency of the first resonant circuit and acquire the pressure intensity in the sealed cavity according to the resonant frequency of the first resonant circuit.

According to an embodiment of the present application, the first detection assembly includes: a second induction coil serving as the second coupling coil, and being in mutual induction with the first induction coil, in which the second induction coil generates a first induction signal according to a voltage signal or a current signal of the first induction coil; and a first detection chip connected with the second induction coil, and configured to detect a frequency of the first induction signal and acquire the resonant frequency of the first resonant circuit according to the frequency of the first induction signal.

According to an embodiment of the present application, the first coil generates an inductance change according to a displacement change of the movable magnetic core, and causes a resonant frequency change of a sensing circuit. The detection unit is pre-stored with an air pressure value of the sealed cavity corresponding to the resonant frequency change, and calculates the air pressure of the sealed cavity according to the resonant frequency change.

According to an embodiment of the present application, the pressure sensing assembly further includes: a body portion defining a pressure chamber therein, the pressure chamber having an opening facing the sealed cavity, and the body portion being provided with an air hole in communication with the pressure chamber; and a flexible sealing sheet disposed at an open end of the body portion to seal the open end, and configured to be deformed towards the pressure chamber when an air pressure in the sealed cavity is greater than an air pressure in the pressure chamber, in which the movable part is disposed to the flexible sealing sheet and configured to move according to deformation of the flexible sealing sheet.

According to an embodiment of the present application, the first coil is wound around an outer periphery of the pressure chamber.

According to an embodiment of the present application, the movable magnetic core has an upper end located in the first coil, and a displacement distance of the upper end of the movable magnetic core in a vertical direction is smaller than an axial length of the first coil.

According to an embodiment of the present application, the air hole is provided in a top of the pressure chamber, an elastic member is provided between the movable magnetic core and the top of the pressure chamber, and the elastic member has two ends connected with a top of the movable magnetic core and a top wall of the pressure chamber, respectively.

According to an embodiment of the present application, the elastic member is configured as a spring.

According to an embodiment of the present application, the pressure detection device further includes a first protection unit, at least a part of the first protection unit being disposed in a predetermined protection position in a moving direction of the movable magnetic core, and the first protection unit being configured to cut off power of a device for increasing the air pressure of the sealed cavity when a top of the movable magnetic core abuts against the first protection unit.

According to an embodiment of the present application, the first protection unit includes a first protection electrode, a second protection electrode, and a first short-circuit detecting circuit. The first protection electrode and the second protection electrode are disposed in predetermined protection positions in the moving direction of the movable magnetic core, and are configured to be short-circuited upon contacting the movable magnetic core. The first short-circuit detecting circuit is connected with the first protection electrode and the second protection electrode, and configured to be generate a first protection signal when detecting that the first protection electrode and the second protection electrode are short-circuited, so as to allow a pressure cooking appliance to perform a protective action according to the first protection signal.

According to an embodiment of the present application, the body portion is substantially formed in a columnar shape having an open lower end; the body portion has an inner wall defining the pressure chamber, and an outer wall spaced apart from the inner wall to define an accommodating cavity; the first coil is wound around the inner wall and located in the accommodating cavity.

According to an embodiment of the present application, a guide groove configured for upward and downward movements of the movable magnetic core is defined between an outer peripheral surface of the movable magnetic core and an inner peripheral surface of the inner wall.

According to an embodiment of the present application, the body portion is configured as a plastic module.

According to an embodiment of the present application, the open end of the body portion has a radial dimension greater than a radial dimension of the pressure chamber.

According to an embodiment of the present application, the pressure sensing assembly further includes: a body portion defining a pressure chamber therein, the pressure chamber having an opening facing the sealed cavity, and the body portion being provided with an air hole in communication with the pressure chamber.

According to an embodiment of the present application, two air holes are provided, and the two air holes are spaced apart in a top of the body portion.

According to an embodiment of the present application, the fixed part includes a fixed electrode, the movable part includes a movable electrode, and the movable electrode is configured to move relative to the fixed electrode when the pressure change is sensed, so as to cause a capacitance value of the pressure sensing assembly to change.

According to an embodiment of the present application, the detection unit includes: a third induction coil serving as the first coupling coil, and connected in parallel or in series with the pressure sensing assembly to constitute a second resonant circuit; and a second detection assembly configured to detect a resonant frequency of the second resonant circuit and acquire the pressure intensity in the sealed cavity according to the resonant frequency of the second resonant circuit.

According to an embodiment of the present application, the second detection assembly includes: a fourth induction coil serving as the second coupling coil, and being in mutual induction with the third induction coil, in which the fourth induction coil generates a second induction signal according to a voltage signal or a current signal of the third induction coil; and a second detection chip connected with the fourth induction coil, and configured to detect a frequency of the second induction signal and acquire the resonant frequency of the second resonant circuit according to the frequency of the second induction signal.

According to an embodiment of the present application, the pressure detection device further includes a second protection unit, at least a part of the second protection unit being disposed to a lower surface of the fixed electrode, and the second protection unit being configured to cut off power of a device for increasing an air pressure of the sealed cavity when at least a part of the movable electrode abuts against the second protection unit.

According to an embodiment of the present application, the second protection unit includes an overload protection electrode and a second short-circuit detecting circuit. The overload protection electrode is disposed to the fixed electrode, and the movable electrode is configured to be short-circuited with the fixed electrode upon contacting the overload protection electrode. The second short-circuit detecting circuit is connected with the fixed electrode and the movable electrode, and generates a second protection signal when detecting that the fixed electrode and the movable electrode are short-circuited, so as to allow a pressure cooking appliance to perform a protective action according to the second protection signal.

According to an embodiment of the present application, the pressure sensing assembly is disposed in the lid and connected with the first coupling coil.

According to an embodiment of the present application, the pressure detection device further includes a controller connected with the other of the second coupling coil and the first coupling coil.

The cooking appliance according to embodiments of a second aspect of the present application includes a cooker body; a cooker lid movably provided on the cooker body, and defining, along with the cooker body, a sealed cavity; and the pressure detection device according to the above embodiments, in which the pressure sensing assembly is disposed to the cooker lid, and at least a part of the detection unit is disposed to the cooker body.

According to an embodiment of the present application, the cooker lid is flippably connected with the cooker body, and the detection unit is in wired connection or wireless connection with the pressure sensing assembly.

According to an embodiment of the present application, the cooker lid is detachably connected with the cooker body, and at least a part of the detection unit is wirelessly connected with the pressure sensing assembly.

According to an embodiment of the present application, the cooker lid is provided with a columnar handle, and the columnar handle serves as the body portion.

According to an embodiment of the present application, the body portion is integrally formed with the cooker lid.

According to an embodiment of the present application, the cooker lid is provided with a strip handle, the strip handle spans two sides of the cooker lid, and the pressure sensing assembly is disposed at a side of the strip handle.

According to an embodiment of the present application, the body portion is connected with the cooker lid through a screw.

According to an embodiment of the present application, the open end of the body portion are separately provided with a connection block at two sides thereof, respectively, the connection block obliquely extends downwards and outwards, and the connection block has an upper end connected with the body portion and an outer side connected with the cooker lid.

According to an embodiment of the present application, a passage in communication with the open end is defined between the connection blocks; a radial dimension of a lower end of the passage is greater than a radial dimension of an upper end of the passage, and the radial dimension of the upper end of the passage is greater than a radial dimension of the open end.

According to an embodiment of the present application, the cooking appliance is configured as a pressure cooker.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and/or additional aspects and advantages of embodiments of the present application will become apparent and more readily appreciated from the following descriptions made with reference to the drawings, in which:

FIG. 34 illustrates a schematic view of a pressure cooker according to another embodiment of the present application.

FIG. 35 illustrates a schematic flow chart of a pressure detection method for a pressure cooker according to an embodiment of the present application.

FIG. 36 illustrates a schematic flow chart of an overvoltage protection detecting method according to an embodiment of the present application.

REFERENCE NUMERALS

Figure 1:
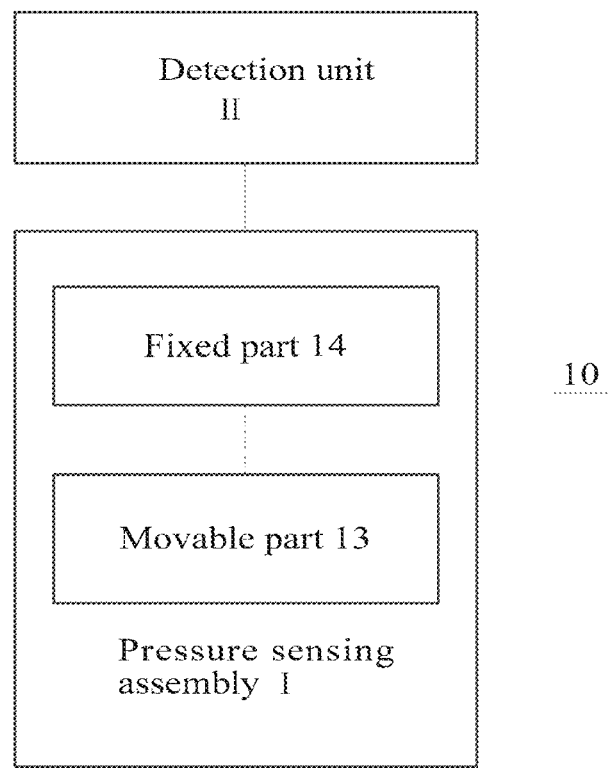
FIG. 1 illustrates a block diagram of a pressure detection device of a pressure cooking appliance according to embodiments of the present application.

A: pressure cooker;
10: pressure detection device; 10a: open end;
I: pressure sensing assembly;
11: body portion (insulation cylinder);
111: pressure chamber; 112: air hole; 113: connection block;
114: accommodating cavity; 116: magnetic core movement guiding groove;
12: flexible sealing sheet;
13: movable part; 13a: movable magnetic core; 13b: movable electrode;
14: fixed part; 14a: first coil; 14b: fixed electrode;
15: elastic member; 16: spring sealing sheet;
II: detection unit
171: first detection assembly; 1711: first detection chip;
172: second detection assembly; 1721: second detection chip;
181: first resonant circuit; 182: second resonant circuit;
191: first protection unit:
1911a: first protection electrode; 1911b: second protection electrode;
1912: first short-circuit detecting circuit;
192: second protection unit:
1921: overload protection electrode (overload prevention); 1922: second short-circuit detecting circuit;
C1: first capacitor;
L1: first induction coil; L2: second induction coil;
L3: third induction coil; L4: fourth induction coil;
20: cooker body; 30: cooker lid.

DETAILED DESCRIPTION

Embodiments of the present application will be described in detail and examples of the embodiments will be illustrated in the drawings, where same or similar reference numerals are used to indicate same or similar elements or elements with same or similar functions. The embodiments described herein with reference to drawings are explanatory, and only used to generally understand the present application. The embodiments shall not be construed to limit the present application.

Pressure in the relevant cooking appliances is a very important measurement and control parameter. As for a pressure cooker, pressure in the cooker can be detected directly by installing a pressure detection device to a cooker lid. In order to facilitate cooking and cleaning, currently, the cooker lid of the pressure cooker is usually detachable, but a connecting wire between a sensor and an internal control circuit becomes a barrier to the detachability of the cooker lid. This dilemma can be solved by using wireless power supply and wireless data transmission technology, but the technology is costly to implement and difficult to use on a large scale.

In the related art, the pressure in the pressure cooker can be detected by the following methods. First method: the pressure in the cooker is directly detected by using a conventional wired active pressure detection device. Second method: the pressure in the cooker is indirectly detected by detecting the temperature within the cooker. Third method: a pressure detection module in the cooker lid is wirelessly powered, and a detection result is fed back to a control circuit board through wireless data transmission. However, there are different problems in the above several methods. In the first method, the cooker lid and the control circuit board are connected by wires, such that the cooker lid is not detachable. In the second method, the pressure in the cooker cannot be sensed directly, resulting in a relatively large measurement error, because the temperature measurement may be biased and delayed. In the third method, the system is complex, costly, and difficult to use on a large scale.

Therefore, the present application proposes a pressure detection device. This pressure detection device has a simple and compact structure with simple wire connection, is convenient to assemble or disassemble, and is particularly suitable for a cooking appliance having a cooker lid and a cooker body separable with each other, thereby simplifying the assembly of the cooker lid and the cooker body.

A pressure detection device 10 according to embodiments of a first aspect of the present application will be described in detail with reference to the drawings.

As illustrated in FIG. 1, the pressure detection device 10 is configured to detect pressure intensity in a sealed cavity (e.g., an inner cavity of a pressure cooking appliance). The pressure detection device 10 further includes a pressure sensing assembly I and a detection unit II. The pressure sensing assembly I includes a fixed part 14 and a movable part 13. The movable part 13 moves relative to the fixed part 14 when it is sensed that the pressure in the sealed cavity varies, so as to change a sensing parameter of the pressure sensing assembly I. The detection unit II is connected with the pressure sensing assembly I, and is configured to obtain the pressure intensity in the sealed cavity based on the current sensing parameter of the pressure sensing assembly I.

In other words, the pressure detection device 10 mainly consists of the pressure sensing assembly I and the detection unit II, in which the pressure sensing assembly I mainly consists of the fixed part 14 and the movable part 13. The movable part 13 of the pressure sensing assembly I is movable relative to the fixed part 14 of the pressure sensing assembly I, along with the change in the pressure intensity in the sealed cavity. For example, a length of the movable part 13 entering the fixed part 14 is made greater and greater, or a distance between the fixed part 14 and the movable part 13 becomes shorter and shorter. Thus, the sensing parameter of the pressure sensing assembly I varies along with the change in the pressure intensity in the sealed cavity, and the detection unit II obtains the pressure intensity in the sealed cavity based on the current sensing parameter of the pressure sensing assembly I, whereby the pressure intensity in the sealed cavity can be detected accurately.

Specifically, the change in the pressure intensity in the sealed cavity causes the movable part 13 to be displaced, and hence causes the sensing parameter of the pressure sensing assembly I to change, such that the pressure intensity in the sealed cavity can be determined by detecting the current sensing parameter of the pressure sensing assembly I. More specifically, when the pressure intensity P is generated in the sealed cavity, the pressure intensity P causes the movable part 13 to be subjected to a thrust F, in which the thrust F and the pressure intensity P satisfy the following relationship: F=PA, in which F refers to the thrust to the outside of the sealed cavity and exerted on the pressure sensing assembly I, P is the pressure intensity in the sealed cavity, and A is a sensing area of the pressure sensing assembly I. Moreover, when the thrust F acts on the movable part 13, the movable part 13 produces a displacement of ΔX with respect to the fixed part 14, and the displacement ΔX causes the sensing parameter of the pressure sensing assembly I to change, in which the current sensing parameter change is denoted by G and the current sensing parameter is denoted by G. The current sensing parameter G of the pressure sensing assembly, the displacement ΔX, the thrust F and the pressure intensity P satisfy the following relationship: G=G(ΔX)=G(F)=G(P) Thus, P=P(G) can be deduced, that is, the pressure intensity P in the sealed cavity can be obtained based on the current sensing parameter G of the pressure sensing assembly I.

Therefore, the pressure detection device 10 according to embodiments of the present application has the simple and compact structure with simple wire connection, is convenient to assemble or disassemble, and simplifies the structure and assembly procedure of its installation carrier; moreover, the pressure detection device 10 can detect a pressure value in an application condition to ensure normal operation of the system, safe and reliable use, and better user experience.

Figure 2:
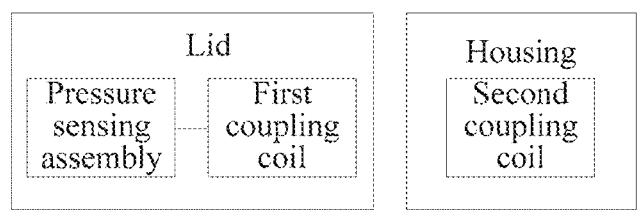
FIG. 2 illustrates a schematic block diagram of the pressure detection device shown in FIG. 1.
Figure 3:
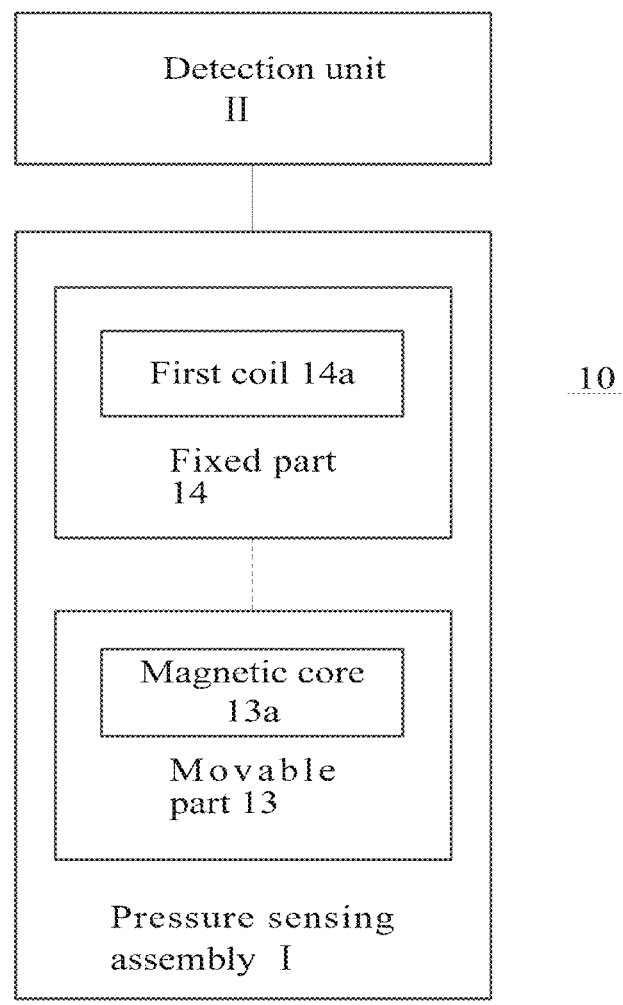
FIG. 3 illustrates a block diagram of a pressure detection device of a pressure cooking appliance according to an embodiment of the present application.

As illustrated in FIG. 2, the sealed cavity is defined by a lid and a housing. The detection unit II includes a first coupling coil and a second coupling coil, the first coupling coil is disposed in the lid, and the second coupling coil is disposed in the housing and wirelessly coupled with the first coupling coil. One of the first coupling coil and the second coupling coil is connected with the pressure sensing assembly I. Further, the pressure sensing assembly I is disposed in the lid and connected with the first coupling coil.

The pressure in the sealed cavity is converted into an electrical signal by the pressure sensing assembly I, and the electrical signal is transmitted to the second coupling coil through the first coupling coil. The second coupling coil can be connected to a controller (not shown) of the detection unit II, and the passive wireless detection is finally realized. Since the pressure detection device 10 is wireless and passive, the pressure detection device 10 can be applied to various cooking appliances so that there is no connecting wire between the cooker lid and the cooker body of the cooking appliance, and the lid can be detached at will; moreover, the structure of the pressure detection device 10 is simple, omitting wireless power supply and wireless data transmission units, and hence has low cost overall. Thus, this device is wireless and passive, and is particularly suitable for a cooking appliance with a removable lid.

The detection unit II further includes the controller. That is, the detection unit II mainly consists of the first coupling coil, the second coupling coil and the controller, and the controller is connected with the other of the first coupling coil and the second coupling coil. The first coupling coil of the detection unit II is connected with the fixed part 14, and the second coupling coil of the detection unit II is connected with the controller, so as to calculate the air pressure outside an open end 10*a* (i.e., the air pressure in the sealed cavity) based on the displacement information sensed by the fixed part 14. Since the first coupling coil and the second coupling coil are wirelessly coupled, there is no connecting wire between the lid and the housing, and the lid can be detached at will; moreover, the pressure detection device 10 has the simple structure and omits the wireless power supply and wireless data transmission units, thereby having low cost overall.

The pressure detection device 10 according to embodiments of the present application will be described in detail with reference to FIGS. 1-11.

FIG. 1 illustrates a block diagram of a pressure detection device of a pressure cooking appliance according to embodiments of the present application. As illustrated in FIG. 1, the pressure detection device 10 of the pressure cooking appliance includes a pressure sensing assembly I and a detection unit II.

The pressure sensing assembly I includes a fixed part 14 and a movable part 13, and the movable part 13 moves relative to the fixed part 14 when a pressure change is sensed, such that a sensing parameter of the pressure sensing assembly I changes. The detection unit II is connected with the pressure sensing assembly I, and the detection unit II is configured to obtain pressure intensity in the pressure cooking appliance based on the current sensing parameter of the pressure sensing assembly I.

The movable part 13 of the pressure sensing assembly I moves relative to the fixed part 14 when the pressure change is sensed, such that the sensing parameter of the pressure sensing assembly I changes. The detection unit II obtains the pressure intensity in the pressure cooking appliance based on the current sensing parameter of the pressure sensing assembly I, so as to accurately detect the pressure intensity in the pressure cooking appliance, improve the accuracy of control over the pressure cooking appliance and upgrade the user experience.

The pressure sensing assembly I further includes a body portion 11 and a flexible sealing sheet 12. Specifically, the body portion 11 defines a pressure chamber 111 having an open end, and the body portion 11 is provided with an air hole 112 in communication with the pressure chamber 111. The flexible sealing sheet 12 is disposed at the open end 10*a* of the body portion 11 to close the open end 10*a*. The flexible sealing sheet 12 is configured to be deformed towards the pressure chamber 111 when the air pressure outside the open end 10*a* (i.e., the air pressure in the sealed cavity) is greater than the air pressure in the pressure chamber 111. The movable part 13 is disposed on the flexible sealing sheet 12 and moves according to the deformation of the flexible sealing sheet 12. The fixed part 14 is spaced apart from the movable part 13, and the fixed part 14 is configured to adapt to the displacement of the movable part 13. The first coupling coil of the detection unit II is connected with the fixed part 14, and the second coupling coil of the detection unit II is connected with a controller of the detection unit II, whereby the air pressure outside the open end 10a (i.e., the air pressure in the sealed cavity) is calculated based on the displacement information sensed by the fixed part 14.

That is, the movable part 13 of the pressure sensing assembly I can move relative to the fixed part 14 of the pressure sensing assembly I, along with the change in the pressure intensity in the sealed cavity. For example, a length of the movable part 13 entering the fixed part 14 becomes greater and greater, or a distance between the fixed part 14 and the movable part 13 gets shorter and shorter. Thus, the sensing parameter of the pressure sensing assembly I varies along with the change in the pressure intensity in the sealed cavity, and the detection unit II obtains the pressure intensity in the sealed cavity based on the current sensing parameter of the pressure sensing assembly I, thereby detecting the pressure intensity in the sealed cavity accurately.

The change in the pressure intensity in the pressure cooking appliance causes the movable part 13 to be displaced, and hence causes the sensing parameter of the pressure sensing assembly I to change, such that the pressure intensity in the pressure cooking appliance can be determined by detecting the current sensing parameter of the pressure sensing assembly I. More specifically, when the pressure intensity P is generated in the pressure cooking appliance, the pressure intensity P causes the movable part 13 to be subjected to a thrust F, in which the thrust F and the pressure intensity P satisfy the following relationship: F=PA, in which F refers to the thrust to the outside of the cooker and exerted on the pressure sensing assembly I, P is the pressure intensity in the pressure cooking appliance, and A is a sensing area of the pressure sensing assembly I. Moreover, when the thrust F acts on the movable part 13, the movable part 13 produces a displacement of ΔX with respect to the fixed part 14, and the displacement ΔX causes the sensing parameter of the pressure sensing assembly I to change, in which the current sensing parameter is denoted by G and the current sensing parameter is denoted by G. The current sensing parameter G of the pressure sensing assembly, the displacement ΔX, the thrust F and the pressure intensity P satisfy the following relationship: G=G(ΔX)=G(F)=G(P). Thus, P=P(G) can be deduced, that is, the pressure intensity P in the pressure cooking appliance can be obtained based on the current sensing parameter G of the pressure sensing assembly I.

An implementation of the pressure detection device 10 will be described in detail with reference to FIGS. 3-5 and FIGS. 6a-6c. The fixed part 14 includes a first coil 14a, and the movable part 13 includes a movable magnetic core 13a. The movable magnetic core 13a moves relative to the first coil 14a when a pressure change is sensed, thereby causing an inductance value of the first coil 14a to change.

Specifically, if the pressure intensity P in the pressure cooking appliance changes, the thrust F towards the outside of the pressure cooking appliance, exerted on the pressure sensing assembly I changes, such that the movable magnetic core 13a moves relative to the first coil 14a, and the inductance value of the first coil 14a changes. Hence, the change of the inductance value of the first coil 14a indicates the change in the pressure intensity P in the pressure cooking appliance, such that the detection unit II can obtain the change in the pressure intensity P generated in the pressure cooking appliance according to the change in the inductance value of the first coil 14a.

More specifically, when the pressure cooking appliance generates the pressure intensity P therein, the pressure intensity P makes the movable magnetic core 13a subjected to the thrust F, and the movable magnetic core 13a can be moved along a center of the first coil 14a towards its interior under the action of the thrust F. According to Faraday's law of electromagnetic induction, the displacement of the movable magnetic core 13a relative to the first coil 14a will cause the inductance value L of the first coil 14a to change. Specifically, the thrust F and the pressure intensity P satisfy the following relationship: F=PA, and the displacement ΔX, the thrust F and the inductance value L satisfy the following relationship L=L(ΔX)=L(F), such that it can be deduced that the pressure intensity P and the current inductance value L of the first coil 14a satisfy the relationship: P=P(L), and the detection unit II can obtain the pressure intensity P in the pressure cooking appliance based on the inductance value of the first coil 14a.

Figure 4:
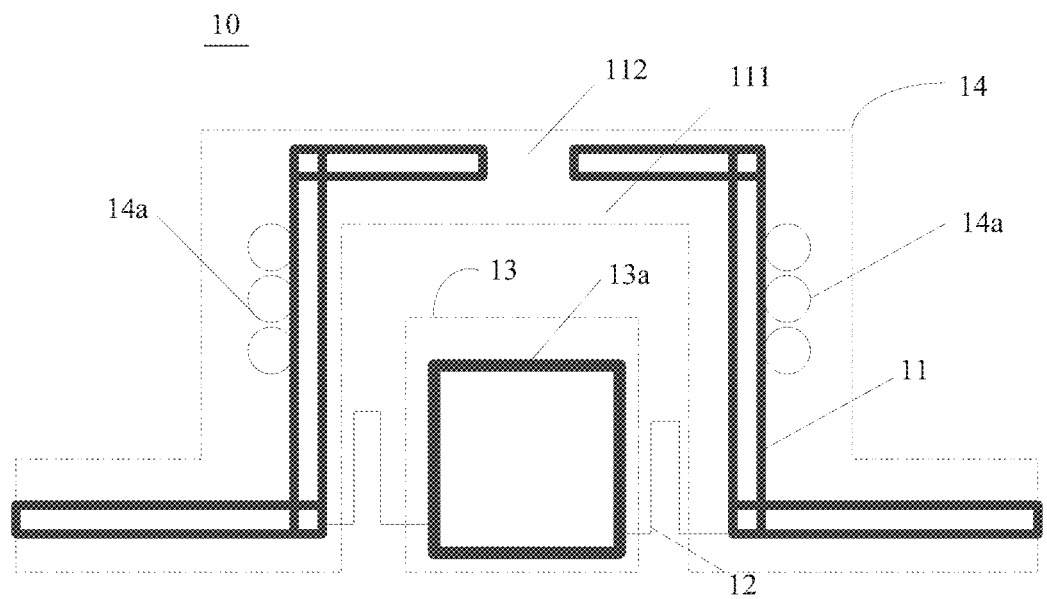
FIG. 4 illustrates a schematic view of a pressure detection device of a pressure cooking appliance according to an embodiment of the present application.

According to an embodiment of the present application, as illustrated in FIG. 4, the detection unit II includes a first capacitor C1, a first detection assembly 171 and a first induction coil L1. The first capacitor C1 is connected in parallel with the first coil 14a to constitute a first resonant circuit 181. The first induction coil L1 forms the first coupling coil, and is connected in parallel or in series with the first coil 14a in the first resonant circuit 181. The first detection assembly 171 is configured to detect resonant frequency f1 of the first resonant circuit 181 and acquire the pressure intensity P in the pressure cooking appliance according to the resonant frequency f1 of the first resonant circuit 181.

Specifically, according to an embodiment of the present application, as illustrated in FIG. 5, the first detection assembly 171 includes a second induction coil L2 and a first detection chip 1711. The second induction coil L2 forms the second coupling coil and is mutually inductive with the first induction coil L1, and the second induction coil L2 generates a first induction signal according to a voltage signal or a current signal of the first induction coil L1. The first detection chip 1711 is connected with the second induction coil L2, and the first detection chip 1711 is configured to detect the frequency of the first induction signal and obtain the resonant frequency of the first resonant circuit 181 based on the frequency of the first induction signal.

That is, the first induction coil L1 and the second induction coil L2 work in a mutually inductive manner. The second induction coil L2 is located on a cooker body 20 and adjacent to the first induction coil L1. The first induction coil L1 is located on a cooker lid 30. The first coil 14a, the first induction coil L1, and the first capacitor C1 constitute the first resonant circuit 181 which is located on the cooker lid 30. Thus, the cooker lid 30 is separable from the cooker body 20, i.e., the cooker lid 30 is detachable.

Figure 5A:
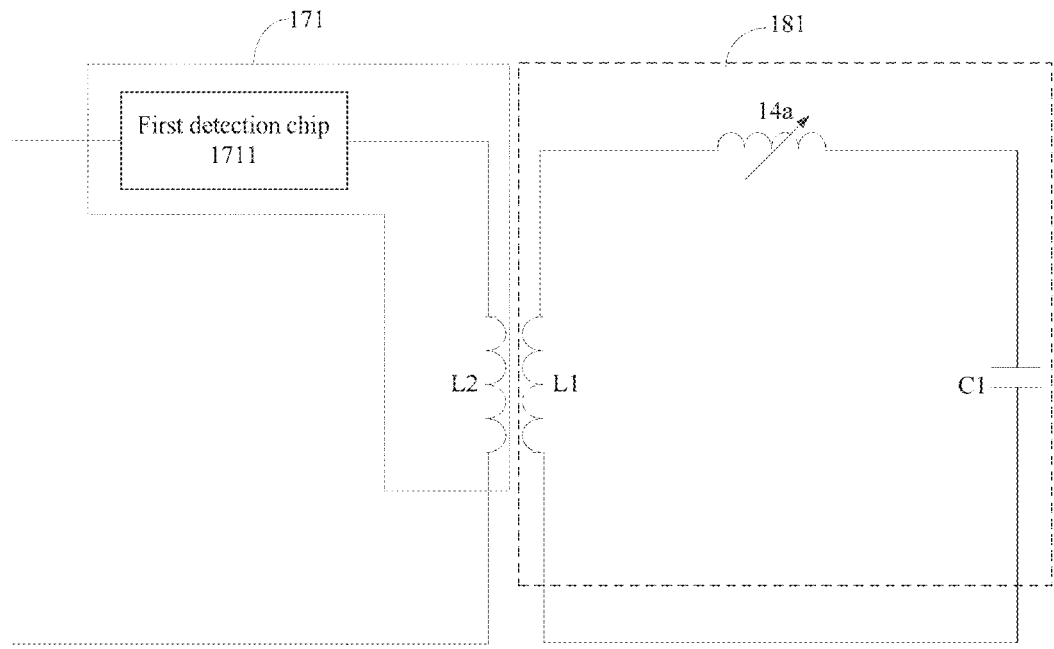
FIG. 5a illustrates a schematic circuit diagram of a pressure detection device of a pressure cooking appliance according to an embodiment of the present application.

By way of example, when the first coil 14a and the first induction coil L1 are connected in series, as illustrated in FIG. 5a, the first induction coil L1 participates in the resonance of the first resonant circuit 181, and at this time, the resonant frequency f1 of the first resonant circuit 181 is calculated as $$f_1 = f_0 + \Delta f = \frac{1}{2\pi\sqrt{(L_0 + L_a + \Delta L)C_1}},$$

in which f1 is the resonant frequency of the first resonant circuit 181, L0 is an inductance value of the first induction coil L1, La is an initial inductance of the first coil 14a, C1 is a capacitance value of the first capacitor, and f0 is an initial resonant frequency, that is, $$f_1 = f_0 = \frac{1}{2\pi\sqrt{(L_0 + L_a)C_1}},$$

and Δf refers to the amount of change in the resonant frequency of the first resonant circuit 181.

Figure 5B:
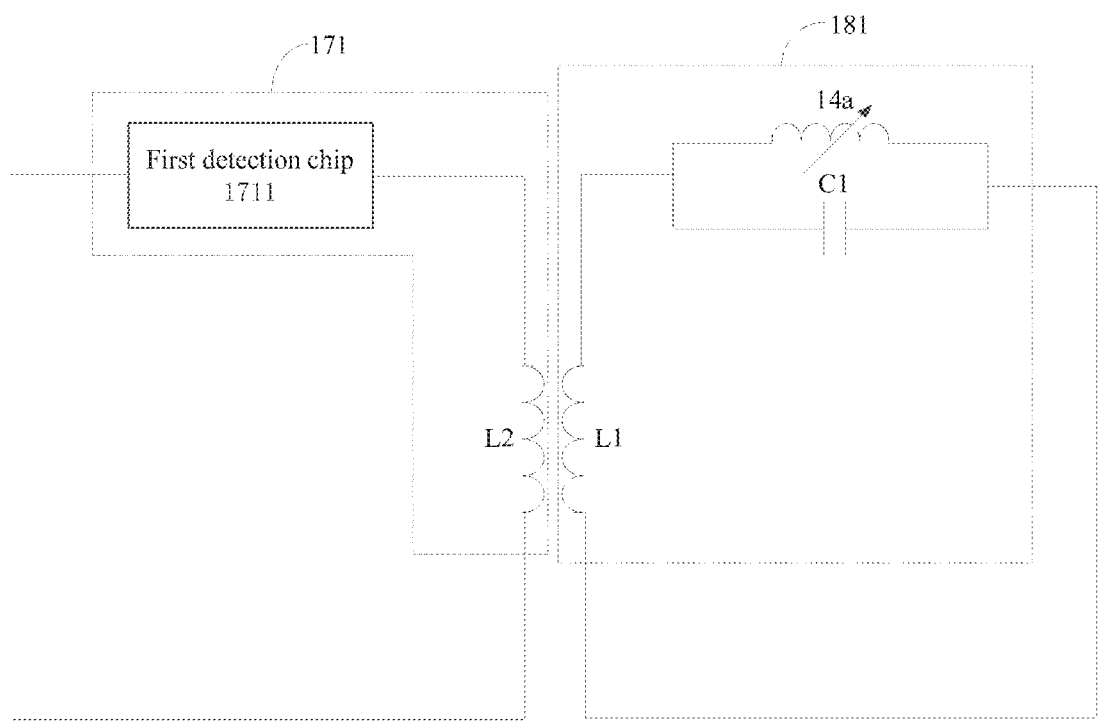
FIG. 5b illustrates a schematic circuit diagram of a pressure detection device of a pressure cooking appliance according to another embodiment of the present application.

When the first coil 14a and the first induction coil L1 are connected in parallel, as illustrated in FIG. 5b, the resonant frequency f1 of the first resonant circuit 181 is calculated as $$f_1 = f_0 + \Delta f = \frac{1}{2\pi\sqrt{\frac{(L_a + \Delta L) * L_0}{L_a + L_0 + \Delta L}C_1}},$$

in which f1 is the resonant frequency of the first resonant circuit 181, L0 is the inductance value of the first induction coil L1, La is the initial inductance of the first coil 14a, C1 is a capacitance value of the first capacitor, and f0 is an initial resonant frequency, that is, $$f_1 = f_0 = \frac{1}{2\pi\sqrt{\frac{L_a * L_0}{L_a + L_0}C_1}},$$

and Δf refers to the amount of change in the resonant frequency of the first resonant circuit 181. The change in the inductance value La of the first coil 14a may cause the resonant frequency f1 of the first resonant circuit 181 to change, such that the pressure intensity P generated in the pressure cooking appliance and the resonant frequency f1 of the first resonant circuit 181 may have the following correspondence relationship: P=P(f)=P(L). The correspondence relationship between the pressure intensity P generated in the pressure cooking appliance and the resonant frequency f1 of the first resonant circuit 181 can be stored in the first detection chip 1711. Hence, after obtaining the resonant frequency f1 of the first resonant circuit 181, the first detection chip 1711 can determine the pressure intensity in the pressure cooking appliance by comparison with the aforementioned correspondence relationship.

Specifically, in the embodiment of the present application, the resonant frequency of the first resonant circuit 181 can be detected by the mutual inductance principle. That is, the first induction coil L1 and the second induction coil L2 are inductive with each other, and the first detection chip 1711 detects the first induction signal sensed by the second induction coil L2, in order to detect the resonant frequency of the first resonant circuit 181. Specifically, in an example where the first induction signal is taken as a voltage signal, the first induction coil L1 is disposed in the first resonant circuit 181, and the frequency of the voltage signal at two ends of the first induction coil L1 is the resonant frequency of the first resonant circuit 181. Based on the mutual inductance principle, the voltage of the second induction coil L2 varies according to the change of the voltage of the first induction coil L1, and thus the first detection chip 1711 can obtain the resonant frequency of the first resonant circuit 181 by detecting the frequency of the voltage signal at two ends of the second induction coil L2.

The first detection chip 1711 can obtain the resonant frequency f1 of the first resonant circuit 181 after acquiring the frequency of the first induction signal, and then the pressure intensity P can be obtained based on the correspondence relationship between the resonant frequency f1 of the first resonant circuit 181 and the pressure intensity P generated in the pressure cooking appliance.

Figure 32:
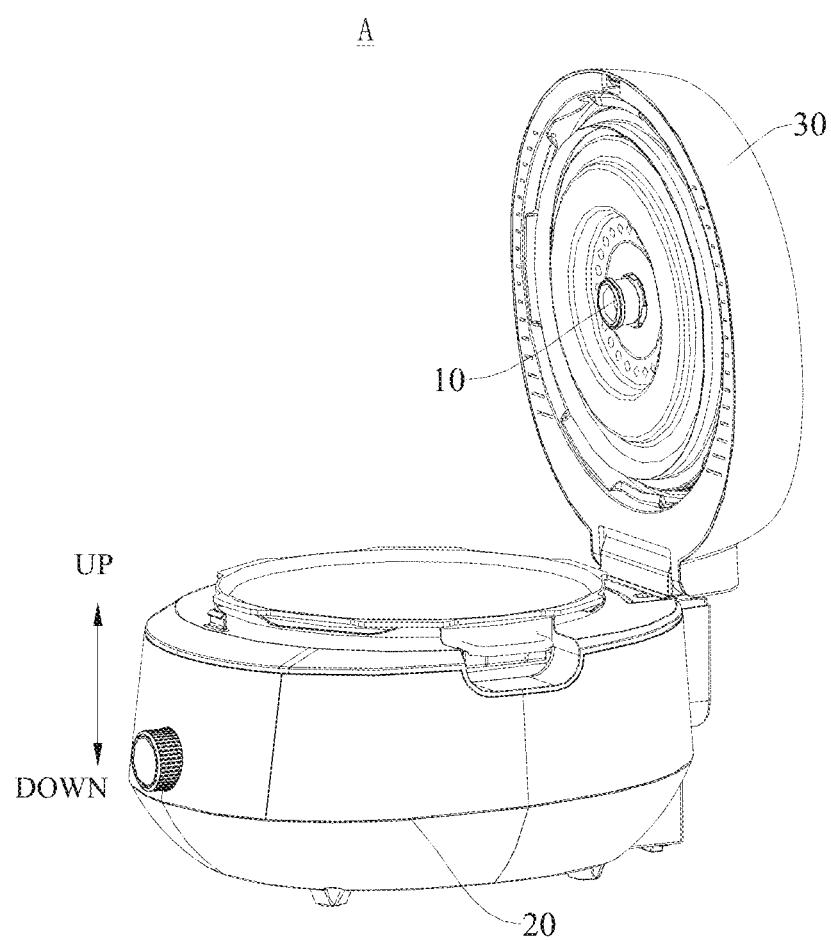
FIG. 32 illustrates a schematic view of a pressure cooker according to an embodiment of the present application.
Figure 33:
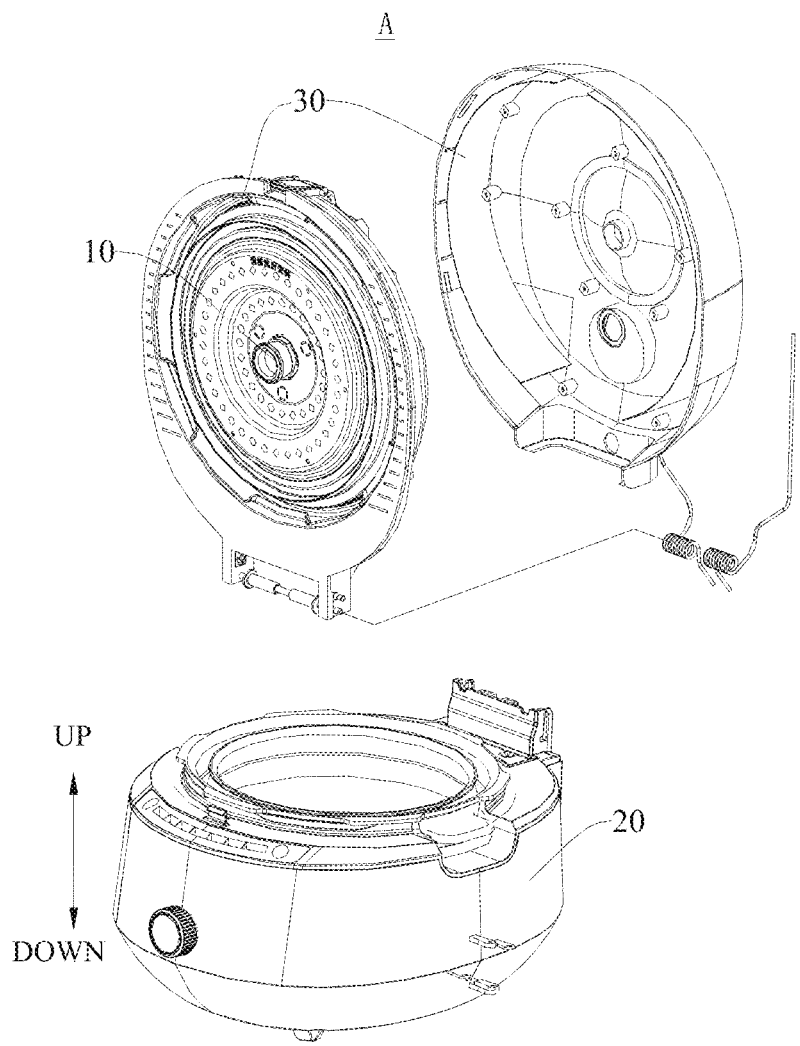
FIG. 33 illustrates an exploded view of the structure shown in FIG. 32.

According to a specific embodiment of the present application, as shown in FIGS. 32-34, the first induction coil L1 is disposed to the cooker lid 30 of the pressure cooking appliance, and the second induction coil L2 is disposed to the cooker body 20 of the pressure cooking appliance, in which the second induction coil L2 is disposed to the cooker body 20 of the pressure cooking appliance and adjacent to the first induction coil L1.

Figure 7:
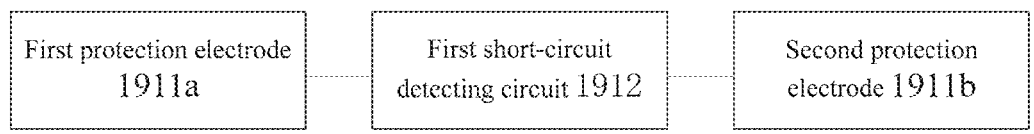
FIG. 7 illustrates a block diagram of a first protection unit in a pressure detection device of a pressure cooking appliance according to an embodiment of the present application.

According to an embodiment of the present application, as shown in FIG. 7, the pressure detection device 10 of the pressure cooking appliance further includes a first protection unit 191. At least a part of the first protection unit 191 is disposed in a predetermined protection position along a moving direction of the movable magnetic core, for example, at the top of the pressure chamber 111. The first protection unit 191 is configured to cut off the power of a device for increasing the air pressure in the sealed cavity when the top of the movable magnetic core 13a is stopped against the first protection unit 191.

Specifically, when the air pressure outside the open end 10a of the pressure chamber 111 (i.e., the air pressure in the sealed cavity) is greater than the air pressure in the pressure chamber 111, the flexible sealing sheet 12 is deformed into the pressure chamber 111 under the pressure difference, and the movable magnetic core 13a moves towards the inside of the pressure chamber 111 along with the deformation of the flexible sealing sheet 12. Then, the first coil 14a generates an inductance change according to the displacement change of the movable magnetic core 13a and causes a resonant frequency change of a sensing circuit. The detection unit II is pre-stored with an air pressure value outside the open end 10a corresponding to the resonant frequency change, and the detection unit II calculates the air pressure outside the open end 10a according to the resonant frequency change. When the air pressure outside the open end 10a of the pressure detection device 10 is overloaded, the movable magnetic core 13a continues to move upwards until it is stopped against at least a part of the first protection unit 191 at the top of the pressure chamber 111, and then a heating power of the system is turned off, so that the air pressure outside the open end 10a of the pressure chamber 111 neither is too high nor falls, which can achieve the overload protection for the system and ensure the safe operation of the system.

The first protection unit 191 includes a first protection electrode 1911a, a second protection electrode 1911b, and a first short-circuit detecting circuit 1912. The first protection electrode 1911a and the second protection electrode 1911b are disposed in a predetermined protection position along the moving direction of the movable magnetic core 13a and are short-circuited when they are in contact with the movable magnetic core 13a. The first short-circuit detecting circuit 1912 is connected to the first protection electrode 1911a and the second protection electrode 1911b, and the first short-circuit detecting circuit 1912 generates a first protection signal when detecting that the first protection electrode 1911a and the second protection electrode 1911b are short-circuited, such that the pressure cooking appliance performs a protective action according to the first protection signal, and for instance, turns off the power supply for the device for increasing the air pressure in the sealed cavity.

Figure 6A:
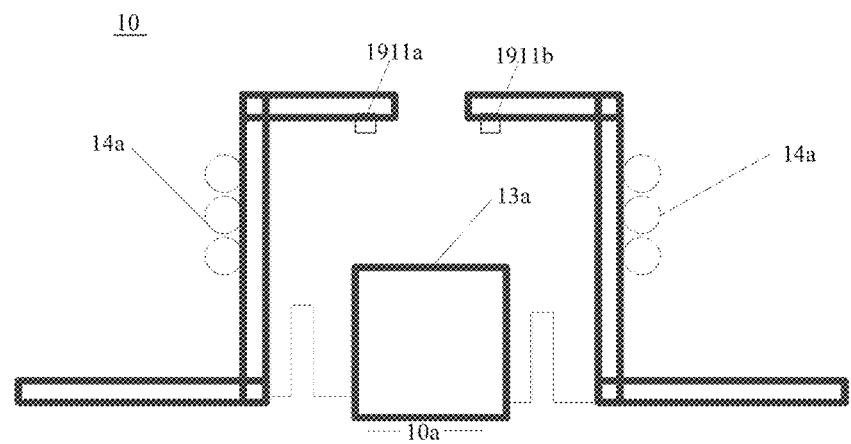
FIG. 6a illustrates a schematic view of a pressure detection device of a pressure cooking appliance according to an embodiment of the present application, in which a movable magnetic core is in an initial position.

By way of example, when the pressure intensity in the pressure cooking appliance is equal to the ambient pressure intensity, the movable magnetic core 13a is not subjected to any thrust and will remain in an initial position shown in FIG. 6a.

Figure 6B:
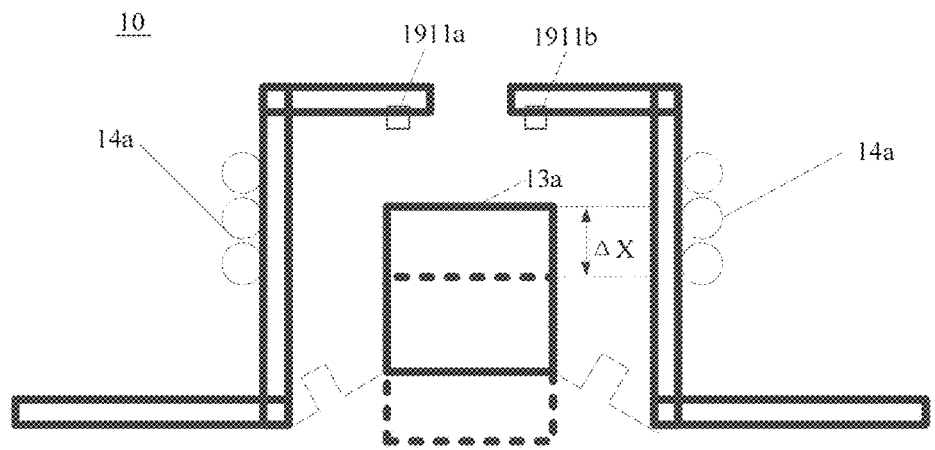
FIG. 6b illustrates a schematic view of a pressure detection device of a pressure cooking appliance according to an embodiment of the present application, in which a movable magnetic core produces a displacement of $\Delta X$.

After the pressure intensity inside the pressure cooking appliance increases, for example, up to an pressure intensity P1 (P1 is less than the maximum limit value of the pressure intensity Pm), the movable magnetic core 13a is subjected to a thrust and moves in a direction from the initial position to the protection electrode by a certain distance, for example, by a displacement of ΔX as shown in FIG. 6b. In such a case, the displacement of the movable magnetic core 13a causes the inductance value L of the first coil 14a to change, thereby causing the resonant frequency of the first resonant circuit 181 to change. The detection unit II can obtain the pressure intensity P according to the correspondence relationship between the resonant frequency f1 of the first resonant circuit 181 and the pressure intensity P generated in the pressure cooking appliance.

Figure 6C:
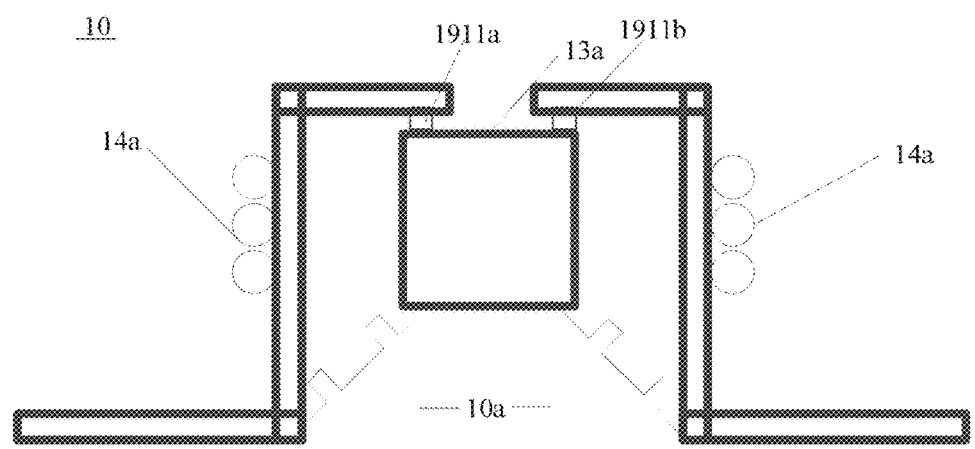
FIG. 6c is a schematic view showing pressure of a pressure detection device of a pressure cooking appliance according to an embodiment of the present application, in which a movable magnetic core reaches a predetermined protection position.

After the pressure intensity inside the pressure cooking appliance continues to increase, for example, up to an pressure intensity P2 (P2 is greater than or equal to the maximum limit value of the pressure intensity Pm), the pressure intensity P2 in the pressure cooking appliance has exceeded the maximum limit value of the pressure intensity Pm of the pressure cooking appliance, and as shown in FIG. 6c, the movable magnetic core 13a comes into contact with the protection electrode, that is, the first protection electrode 1911a and the second protection electrode 1911b, in which case the first protection electrode 1911a and the second protection electrode 1911b are short-circuited. The first short-circuit detecting circuit 1912 generates the first protection signal after detecting that the first protection electrode 1911a and the second protection electrode 1911b are short-circuited, and the controller or the detection unit II in the pressure cooking appliance performs the protective action after acquiring the first protection signal, for example, controlling a heating unit to stop heating in order to protect the pressure cooking appliance.

Another implementation of the pressure detection device 10 will be described in detail with reference to FIGS. 8-9 and FIGS. 10a-10c. The fixed part 14 includes a fixed electrode 14b, and the movable part 13 includes a movable electrode 13b. The movable electrode 13b moves relative to the fixed electrode 14b when a pressure change is sensed, thereby causing a capacitance value C2 of the pressure sensing assembly I to change.

According to a specific embodiment of the present application, the fixed electrode 14b and the movable electrode 13b may be metal plates. The capacitance value C2 of the pressure sensing assembly I may refer to a capacitance value between the movable electrode 13b and the fixed electrode 14b.

Specifically, if the pressure intensity P in the pressure cooking appliance changes, the thrust F towards the outside of the pressure cooking appliance, exerted on the pressure sensing assembly I changes, such that the movable electrode 13b moves towards the fixed electrode 14b, and the capacitance value C2 of the pressure sensing assembly I changes. Hence, the change of the capacitance value C2 of the pressure sensing assembly I indicates the change in the pressure intensity P in the pressure cooking appliance, such that the detection unit II can obtain the change in the pressure intensity P generated in the pressure cooking appliance according to the change in the capacitance value C2 of the pressure sensing assembly I.

More specifically, when the pressure intensity P is generated in the pressure cooking appliance, the pressure intensity P causes the movable electrode 13b to be subjected to the thrust F, and the movable electrode 13b moves towards the fixed electrode 14b under the action of the thrust F. According to the calculation formula of the capacitance, i.e., $$C = \frac{\varepsilon S}{4\pi k d},$$

the capacitance value C2 of the pressure sensing assembly I is related to a distance d between two electrode plates (i.e., the distance between the fixed electrode 14b and the movable electrode 13b). When the distance d between the two electrode plates changes, the capacitance value C2 will change. Specifically, since the thrust F and the pressure intensity P satisfy the following relationship: F=PA, and the displacement ΔY, the thrust F, and the capacitance value C2 satisfy the following relationship: C=C(ΔY)=C(F) the relationship between the pressure intensity P and the capacitance value C can be derived, i.e., P=P(C), and the detection unit II can obtain the pressure intensity P in the pressure cooking appliance according to the capacitance value C.

Figure 9:
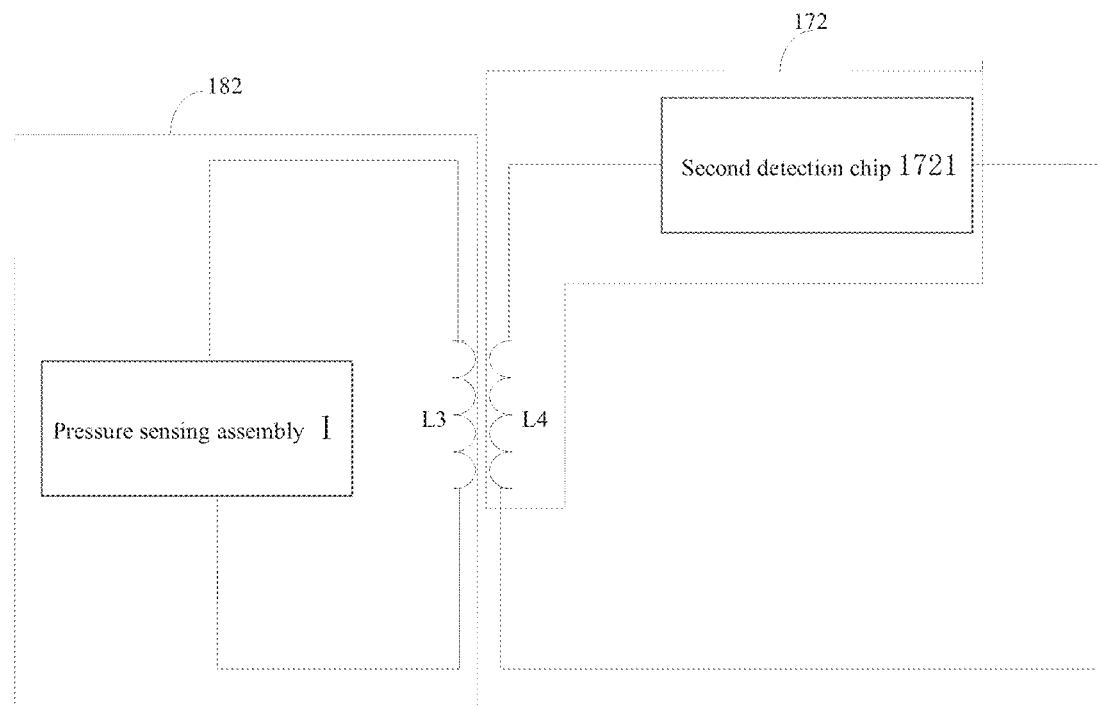
FIG. 9 illustrates a schematic circuit diagram of a pressure detection device of a pressure cooking appliance according to an embodiment of the present application.

According to an embodiment of the present application, as shown in FIG. 9, the detection unit II includes a third induction coil L3 and a second detection assembly 172. The third induction coil L3 forms a first coupling coil and is connected in parallel or in series with the pressure sensing assembly I to constitute a second resonant circuit 182. The second detection group 107 is configured to detect a resonant frequency f2 of the second resonant circuit 182, and acquire the pressure intensity P in the pressure cooking appliance according to the resonant frequency f2 of the second resonant circuit 182.

According to an embodiment of the present application, as shown in FIG. 9, the second detection assembly 172 includes a fourth induction coil L4 and a second detection chip 1721. The fourth induction coil L4 forms a second coupling coil and is mutually inductive with the third induction coil L3, and the fourth induction coil L4 generates a second induction signal according to a voltage signal or a current signal of the third induction coil L3. The second detection chip 1721 is connected with the fourth induction coil L4, and the fourth induction coil L4 is configured to detect the frequency of the second induction signal and obtain the resonant frequency f of the second resonant circuit 182 based on the frequency of the second induction signal.

That is, the third induction coil L3 and the pressure sensing assembly I constitute the second resonant circuit 182. In such a case, the resonant frequency f2 of the second resonant circuit 182 is calculated as $$f_2 = \frac{1}{2\pi\sqrt{L_0 C_2}},$$

in which L1 is an inductance value of the third induction coil L3, and C2 is a capacitance value between the movable electrode 13b and the fixed electrode 14b.

The change in the capacitance value C2 of the pressure sensing assembly I will cause the resonant frequency f2 of the second resonant circuit 182 to change, whereby the pressure intensity P generated in the pressure cooking appliance and the resonant frequency f2 of the second resonant circuit 182 may have the following correspondence relationship: P=P(f)=P(C). The correspondence relationship between the pressure intensity P generated in the pressure cooking appliance and the resonant frequency f2 of the second resonant circuit 182 can be stored in the second detection chip 1721, such that after the second detection chip 1721 acquires the resonant frequency f2 of the second resonant circuit 182, the pressure intensity in the pressure cooking appliance can be determined by comparison with the aforementioned correspondence relationship.

Specifically, in the embodiment of the present application, the resonant frequency f2 of the second resonant circuit 182 can be detected by the mutual inductance principle. That is, the third induction coil L3 and the fourth induction coil L4 are inductive with each other, and the second detection chip 1721 detects the second induction signal sensed by the fourth induction coil L4, in order to detect the resonant frequency of the second resonant circuit 182. Specifically, in an example where the second induction signal is taken as a voltage signal, the third induction coil L3 is disposed in the second resonant circuit 182, and the frequency of the voltage signal at two ends of the third induction coil L3 is the resonant frequency of the second resonant circuit 182. Based on the mutual inductance principle, the voltage of the fourth induction coil L4 varies according to the change of the voltage of the third induction coil L3, and thus the second detection chip 1721 can obtain the resonant frequency of the second resonant circuit 182 by detecting the frequency of the voltage signal at two ends of the fourth induction coil L4.

The second detection chip 1721 can obtain the resonant frequency f2 of the second resonant circuit 182 after acquiring the frequency of the second induction signal, and then the pressure intensity P can be obtained based on the correspondence relationship between the resonant frequency f2 of the second resonant circuit 182 and the pressure intensity P generated in the pressure cooking appliance.

According to an embodiment of the present application, as shown in FIGS. 32-34, the third induction coil L3 is disposed on the cooker lid 30 of the pressure cooking appliance, and the fourth induction coil L4 is disposed on the cooker body 20 of the pressure cooking appliance, in which the fourth induction coil L4 is disposed on the cooker body 20 of the pressure cooking appliance and adjacent to the third induction coil L3.

Figure 11:
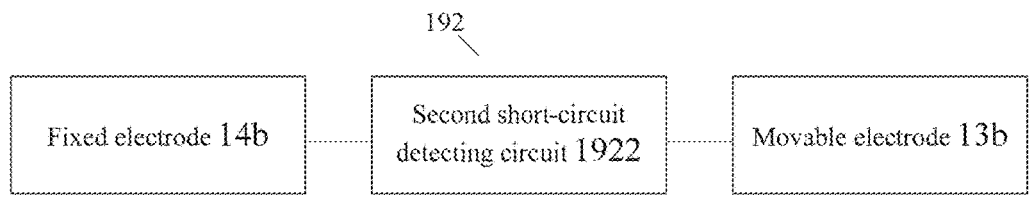
FIG. 11 illustrates a block diagram of a second protection unit in a pressure detection device of a pressure cooking appliance according to another embodiment of the present application.

According to an embodiment of the present application, as shown in FIG. 11, the pressure detection device 10 of the pressure cooking appliance further includes a second protection unit 192. At least a part of the second protection unit 192 is disposed to a lower surface of the fixed electrode 14b.

The second protection unit 192 is configured to cut off the power of a device for increasing the air pressure in the sealed cavity when at least a part of the movable electrode 13b is stopped against the second protection unit 192.

Specifically, when the movable magnetic core 13a moves upwards until it is stopped against the second protection unit 192 on the fixed electrode 14b at the top of the pressure chamber 111, the power of the system is turned off, so that the air pressure outside the open end 10a of the pressure chamber 111 (i.e., the air pressure in the sealed cavity) neither is too high nor falls, which can achieve the overload protection for the system and ensure the safe operation of the system.

The second protection unit 192 includes an overload protection electrode 1921 and a second short-circuit detecting circuit 1922. The overload protection electrode 1921 is disposed on the fixed electrode 14b. The movable electrode 13b is short-circuited with the fixed electrode 14b when the movable electrode 13b comes into contact with the overload protection electrode 1921. The second short-circuit detecting circuit 1922 is connected to the fixed electrode 14b and the movable electrode 13b, and the second short-circuit detecting circuit 1922 generates a second protection signal when detecting that the first coil 14a and the movable electrode 13b are short-circuited, such that the pressure cooking appliance performs a protective action according to the second protection signal, and for instance, turns off the power supply for the device for increasing the air pressure in the sealed cavity.

Figure 10A:
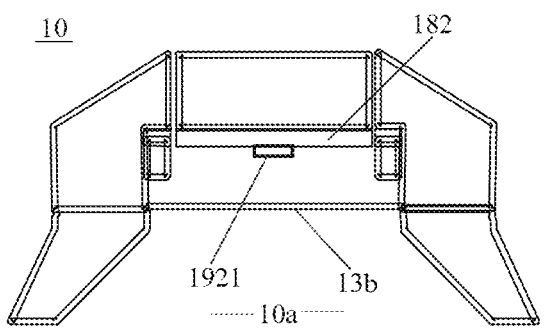
FIG. 10a illustrates a schematic view of a pressure detection device of a pressure cooking appliance according to another embodiment of the present application, in which a movable electrode is in an initial position.

By way of example, when the pressure intensity in the pressure cooking appliance is equal to the ambient pressure intensity, the movable electrode 13b is not subjected to any thrust and will remain in an initial position shown in FIG. 10a.

Figure 10B:
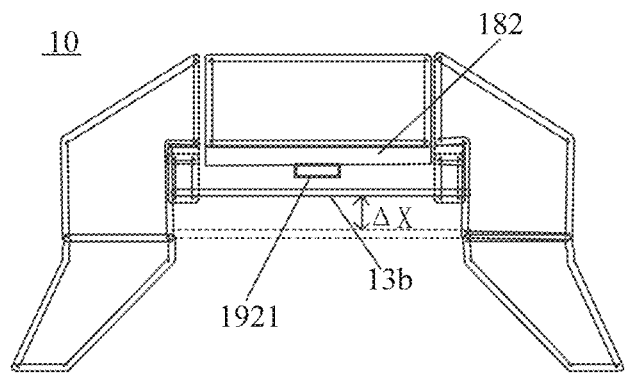
FIG. 10b illustrates a schematic view of a pressure detection device of a pressure cooking appliance according to an embodiment of the present application, in which a movable electrode produces a displacement of $\Delta Y$.

After the pressure intensity inside the pressure cooking appliance increases, for example, up to an pressure intensity P1 (P1 is less than the maximum limit value of the pressure intensity Pm), the movable electrode 13b is subjected to a thrust and moves in a direction from the initial position to the fixed electrode 14b by a certain distance, for example, by a displacement of ΔY as shown in FIG. 10b. In such a case, the displacement of the movable electrode 13b causes the capacitance between the movable electrode 13b and the fixed electrode 14b to change, thereby causing the resonant frequency of the second resonant circuit 182 to change. The detection unit II can obtain the pressure intensity P according to the correspondence relationship between the resonant frequency f2 of the second resonant circuit 182 and the pressure intensity P generated in the pressure cooking appliance.

Figure 10C:
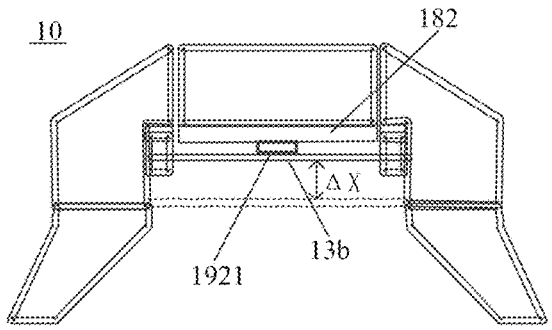
FIG. 10c illustrates a schematic view of a pressure detection device of a pressure cooking appliance according to an embodiment of the present application, in which a movable electrode reaches a predetermined protection position.

After the pressure intensity inside the pressure cooking appliance continues to increase, for example, up to an pressure intensity P2 (P2 is greater than or equal to the maximum limit value of the pressure intensity Pm), the pressure intensity P2 in the pressure cooking appliance has exceeded the maximum limit value of the pressure intensity Pm of the pressure cooking appliance, and as shown in FIG. 10c, the movable electrode 13b comes into contact with the overload protection electrode 1921, in which case the movable electrode 13b and the fixed electrode 14b are short-circuited. The second short-circuit detecting circuit 1922 generates the second protection signal after detecting that the movable electrode 13b and the fixed electrode 14b are short-circuited, and the controller or the detection unit II in the pressure cooking appliance performs the protective action after acquiring the second protection signal, for example, controlling a heating unit to stop heating in order to protect the pressure cooking appliance.

According to one embodiment of the present application, as shown in FIG. 32-34, the pressure sensing assembly I is disposed on the cooker lid 30 of the pressure cooking appliance.

In conclusion, for the pressure detection device of the pressure cooking appliance according to the embodiments of the present application, the movable part of the pressure sensing assembly moves relative to the fixed part when the pressure change is sensed, so that the sensing parameter of the pressure sensing assembly changes. The detection unit acquires the pressure intensity in the pressure cooking appliance according to the current sensing parameter of the pressure sensing assembly, thereby accurately detecting the pressure intensity in the pressure cooking appliance, improving the control precision of the pressure cooking appliance, and upgrading the user experience. The device is wireless and passive, and is particularly suitable for a cooking appliance with a removable lid.

The pressure detection device 10 according to embodiments of the present application will be described in detail with reference to FIGS. 12-19.

The pressure detection device 10 according to the embodiments of the present application includes a pressure sensing assembly I and a detection unit II. The pressure sensing assembly I further includes a body portion 11 and a flexible sealing sheet 12. Specifically, the body portion 11 defines a pressure chamber 111 having an open end, and the body portion 11 is provided with an air hole 112 in communication with the pressure chamber 111. The flexible sealing sheet 12 is disposed at the open end 10a of the body portion 11 to close the open end 10a. The flexible sealing sheet 12 is configured to be deformed towards the pressure chamber 111 when the air pressure outside the open end 10a (i.e., the air pressure in the sealed cavity) is greater than the air pressure in the pressure chamber 111. The movable part 13 is disposed on the flexible sealing sheet 12 and moves according to the deformation of the flexible sealing sheet 12. The fixed part 14 is spaced apart from the movable part 13, and the fixed part 14 is configured to adapt to the displacement of the movable part 13. The detection unit II is connected with the fixed part 14 to calculate the air pressure outside the open end 10a based on the displacement information sensed by the fixed part 14.

Figure 12:
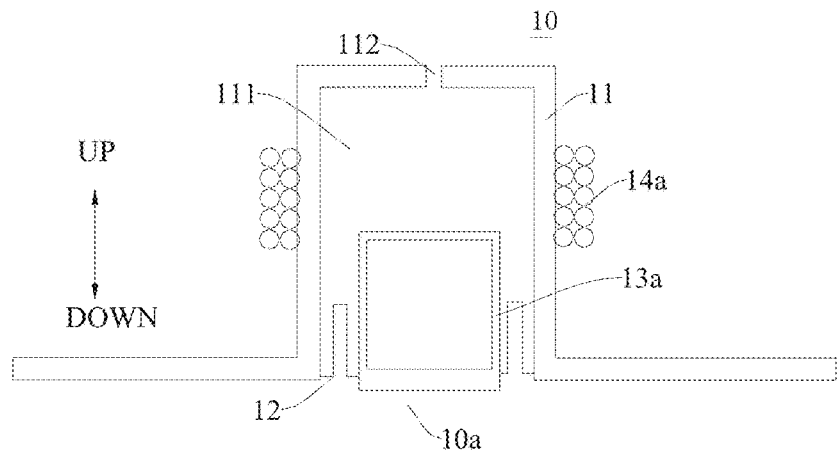
FIG. 12 illustrates a schematic view of a pressure sensor in a working state according to an embodiment of the present application.

In other words, the pressure detection device 10 mainly consists of the body portion 11, the flexible sealing sheet 12, the movable part 13, the fixed part 14 and the detection unit II. The body portion 11 extends along a vertical direction (an up-down direction as shown in FIG. 12). The body portion 11 internally defines a pressure chamber 111 having an open end (a lower end as shown in FIG. 12), and the body portion 11 is provided with an air hole 112 in communication with the pressure chamber 111.

The flexible sealing sheet 12 is disposed at the open end of the body portion 11 to close an opening of the pressure chamber 111. When there is a pressure difference between the inner cavity of the pressure chamber 111 and the sealed cavity, the flexible sealing sheet 12 can be deformed. Specifically, if the air pressure of the sealed cavity at the open end 10a of the pressure detection device 10 is greater than the air pressure of the inner cavity of the pressure chamber 111, the flexible sealing sheet 12 moves towards the pressure chamber 111, that is, being deformed towards the pressure chamber 111; if the air pressure outside the open end 10a of the pressure detection device 10 (i.e., the air pressure in the sealed cavity) is smaller than the air pressure of the inner cavity pressure of the pressure chamber 111, the flexible sealing sheet 12 moves away from the pressure chamber 111, that is, being deformed away from the pressure chamber 111.

Further, the flexible sealing sheet 12 is provided with the movable part 13, and the movable part 13 can move towards the pressure chamber 111 or move away from the pressure chamber 111 according to the deformation of the flexible sealing sheet 12. The fixed part 14 is provided on the body portion 11 or at a position adjacent to the body portion 11. When the movable part 13 is displaced, the detection unit II can sense the displacement information of the movable part 13, and then feed the sensed displacement information back to the controller of the detection unit II. Afterwards, the controller of the detection unit II can acquire the exact value of the air pressure outside the pressure detection device 10 (i.e., the air pressure in the sealed cavity) according to the received displacement information.

Therefore, the pressure detection device 10 according to the embodiments of the present application has the simple and compact structure with simple wire connection, is convenient to assemble or disassemble, and simplifies the structure and assembly procedure of its installation carrier; moreover, the pressure detection device 10 can detect a pressure value in an application condition to ensure the normal operation of the system, safe and reliable use, and better user experience.

Figure 13:
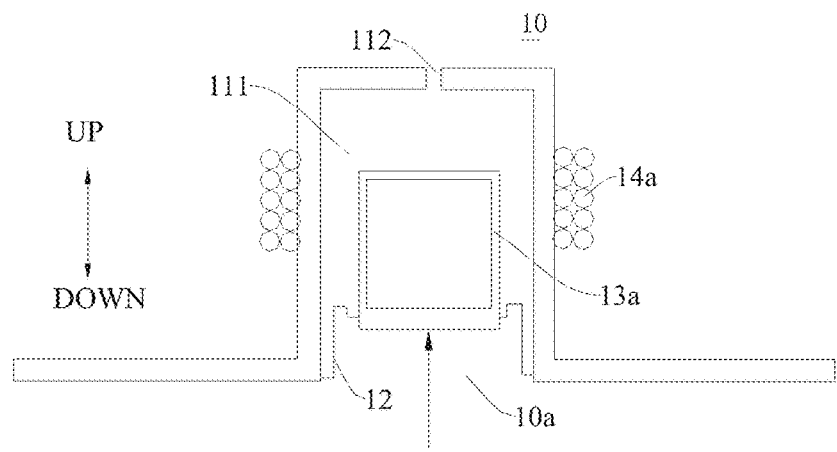
FIG. 13 illustrates a schematic view of the pressure sensor of FIG. 12 in another working state.

Optionally, the lower end of the body portion 11 is open, and the flexible sealing sheet 12 can be deformed in the up-down direction. Referring to FIGS. 12 and 13, the body portion 11 extends in the up-down direction, and the body portion 11 internally defines the pressure chamber 111 extending in an axial direction thereof. The upper end of the body portion 11 is provided with the air hole 112 in communication with the pressure chamber 111, and the lower end of the body portion 11 forms an open end. The flexible sealing sheet 12 is disposed at the lower end of the body portion 11 to close the opening of the pressure chamber 111, and the flexible sealing sheet 12 can be deformed according to the pressure difference between the air pressure of the pressure chamber 111 and the air pressure outside the open end 10a of the pressure detection device 10, thereby driving the movable part 13 to move.

Optionally, the movable part 13 is configured as the movable magnetic core 13a, and the fixed part 14 is configured as the first coil 14a. The first coil 14a generates an inductance change according to the displacement change of the movable magnetic core 13a, and hence causes a change in a coupling parameter of the first coupling coil and the second coupling coil, that is, causing a resonant frequency change of the sensing circuit. The detection unit II is pre-stored with an air pressure value outside the open end 10a corresponding to the resonant frequency change, and the controller calculates the air pressure outside the open end 10a according to the resonant frequency change.

Specifically, the movable magnetic core 13a is formed in a columnar shape extending in the axial direction of the body portion 11, and the movable magnetic core 13a is disposed on the flexible sealing sheet 12 to move along with the deformation of the flexible sealing sheet 12. The first coil 14a may be disposed on the body portion 11 or adjacent to the body portion 11. The flexible sealing sheet 12 has an elastic coefficient of k, a pressure sensing area is denoted by A, and the pressure intensity outside the open end 10a of the pressure detection device 10 is denoted by P. When the movable magnetic core 13a is moving, the first coil 14a can sense the displacement of the movable magnetic core 13a, and the flexible sealing sheet 12 of the pressure detection device 10 is subjected to an outward thrust by the air pressure outside the open end 10a of the pressure detection device 10, in which the outward thrust is F=PA. The flexible sealing sheet 12 is deformed by the air pressure outside the open end 10a, and drives the movable magnetic core 13a to move upwards by x=F/k=PA/k. The displacement x of the movable magnetic core 13a causes the inductance L of the first coil 14a to change, and the inductance change of the first coil 14a causes the resonant frequency change f of the sensing circuit, so that the pressure intensity P outside the open end 10a of the pressure detection device 10 and the resonant frequency f of the sensing circuit have a relationship as shown by the graph in FIG. 29. The relationship is pre-stored in a controller (for example, a chip microcomputer) of the detection unit II of the pressure detection device 10. In practical applications, the control system measures the resonant frequency change f of the sensing circuit through the mutual inductance principle, and the controller can calculate the air pressure in the cooker body 20 of the cooking appliance (e.g., the pressure cooker) according to the above relationship.

Therefore, the pressure detection device 10 has the simple and compact structure with simple wire connection, is convenient to assemble or disassemble, and is sensitive, which is advantageous to simplifying the structure and installation procedure of the system.

In some specific embodiments of the present application, the first coil 14a is wound around an outer periphery of the pressure chamber 111, that is, the first coil 14a is disposed outside the pressure chamber 111 and extends along a circumferential direction of the pressure chamber 111. It can also be understood in such a way that the first coil 14a is disposed at the outer periphery of the movable magnetic core 13a and spaced apart from the movable magnetic core 13a, thereby ensuring the occurrence of electromagnetic induction between the first coil 14a and the movable magnetic core 13a, so as to guarantee the accuracy and sensitivity of the air pressure value at the open end 10a of the pressure detection device 10 as detected by the pressure detection device 10.

Advantageously, the movable magnetic core 13a has an upper end located inside the first coil 14a, and the displacement of the upper end of the movable magnetic core 13a in the vertical direction is smaller than an axial length of the first coil 14a.

Referring to FIGS. 11 and 12, when the air pressure outside the open end 10a of the pressure detection device 10 changes, the pressure difference between the air pressure in the pressure chamber 111 and the air pressure outside the open end 10a of the pressure chamber 111 causes the flexible sealing sheet 12 to be deformed, and the movable magnetic core 13a can move up and down along with the deformation of the flexible sealing sheet 12. Specifically, the movable magnetic core 13a is disposed in the pressure chamber 111, and the movable magnetic core 13a has a lower end connected to the flexible sealing sheet 12 and an upper end extending into the first coil 14a. The movable magnetic core 13a can move up and down between a first position and a second position, and a distance between the first position and the second position in an axial direction of the movable magnetic core 13a is smaller than the axial length of the first coil 14a, thereby ensuring that at least a part of the movable magnetic core 13a is always located inside the first coil 14a during the up-and-down movement, so as to guarantee the normal operation of the pressure detection device 10 and ensure that the pressure detection device 10 can detect the air pressure value of the sealed cavity in real time (the air pressure value at the open end 10a of the pressure detection device 10).

It should be noted herein that the first position and the second position can be understood as two limit positions for the movable magnetic core 13a when it moves in the pressure chamber 111. For example, the first position is a limit position when the movable magnetic core 13a moves towards the inside of the pressure chamber 111 (a position where the movable magnetic core 13a is located as shown in FIG. 13), and the second position is a limit position when the movable magnetic core 13a moves away from the pressure chamber 111 (a position where the movable magnetic core 13a is located as shown in FIG. 12).

Advantageously, the air hole 112 is disposed at the top of the pressure chamber 111, an elastic member 15 is provided between the movable magnetic core 13a and the top of the pressure chamber 111, and two ends of the elastic member 15 are connected with the top of the movable magnetic core 13a and a top wall of the pressure chamber 111 respectively.

Figure 14:
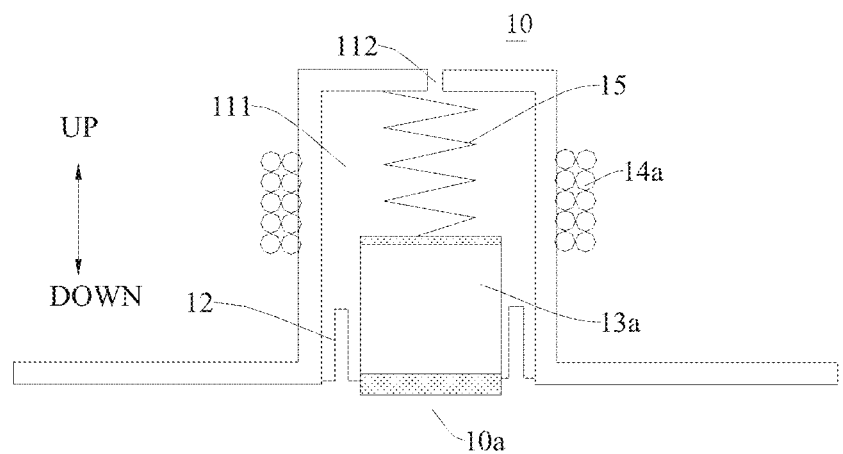
FIG. 14 illustrates a schematic view of a pressure sensor in a working state according to still another embodiment of the present application.
Figure 15:
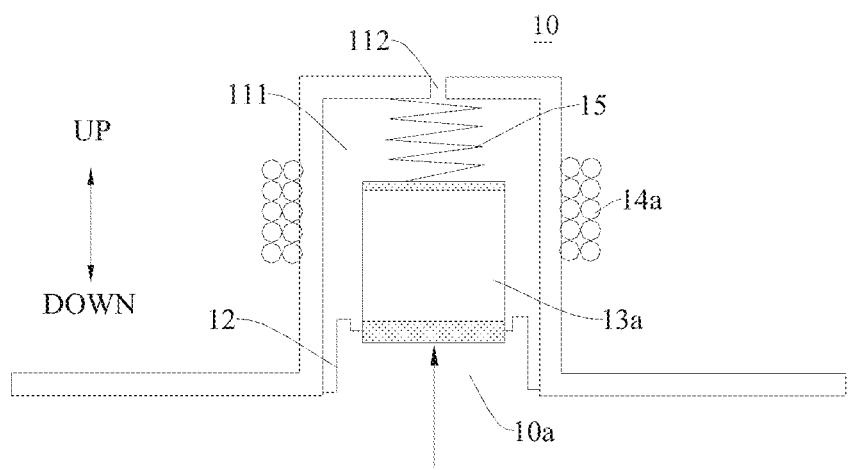
FIG. 15 illustrates a schematic view of the pressure sensor of FIG. 14 in another working state.

Specifically, as illustrated in FIGS. 14 and 15, the body portion 11 is in a columnar shape extending along the vertical direction (an up-down direction as shown in FIG. 14). The body portion 11 internally defines a pressure chamber 111 having an open lower end, and the flexible sealing sheet 12 is disposed at the lower end of the body portion 11 to close the opening of the pressure chamber 111. The movable magnetic core 13a is disposed in the pressure chamber 111 and has the lower end connected with the flexible sealing sheet 12. The pressure chamber 111 is further provided with the elastic member 15 therein, and the elastic member 15 has an upper end connected with an inner top wall of the body portion 11 and a lower end connected with the upper end of the movable magnetic core 13a.

When the air pressure outside the open end 10a of the pressure chamber 111 is greater than the air pressure of the inner cavity of the pressure chamber 111, the movable magnetic core 13a moves upwards along with the deformation of the flexible sealing sheet 12, and the elastic member 15 can serve as a buffer to avoid collision with the body portion 11 in case that the movable magnetic core 13a is too rushed. When the air pressure outside the open end 10a of the pressure chamber 111 is gradually decreased until the air pressure outside the open end 10a of the pressure chamber 111 becomes balanced with the air pressure outside the open end 10a of the pressure chamber 111, the movable magnetic core 13a moves downwards by a restoring force of the elastic member 15 and by its gravity, thereby returning to the initial position.

Therefore, by providing the elastic member 15 in the pressure chamber 111 and between the movable magnetic core 13a and the top wall of the pressure chamber 111, the movement stability of the movable magnetic core 13a can be guaranteed, thereby prolonging the service life of the pressure detection device 10.

Optionally, the elastic member 15 is configured as a spring. Specifically, two ends of the spring are connected with the upper end of the movable magnetic core 13a and the inner top wall of the body portion 11 respectively. The spring has a simple structure and low cost, which is conductive to reducing the cost of the pressure detection device 10. Moreover, the spring is sensitive to an external force, and hence the sensitivity of the pressure detection device 10 can be improved, which ensures that the pressure detection device 10 can accurately detect the air pressure value of the open end 10a of the pressure detection device 10 in real time, and guarantees the accuracy of the air pressure value detected by the pressure detection device 10 at the open end 10a.

Figure 16:
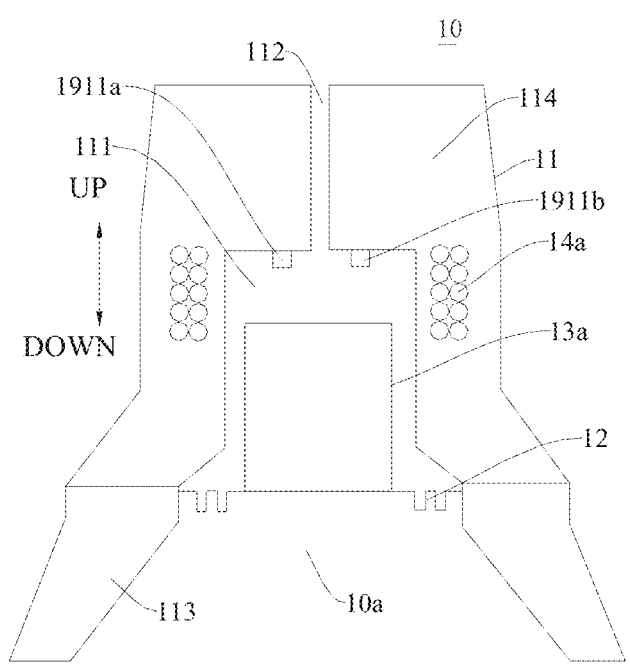
FIG. 16 illustrates a schematic view of a pressure sensor in a working state according to another embodiment of the present application.
Figure 17:
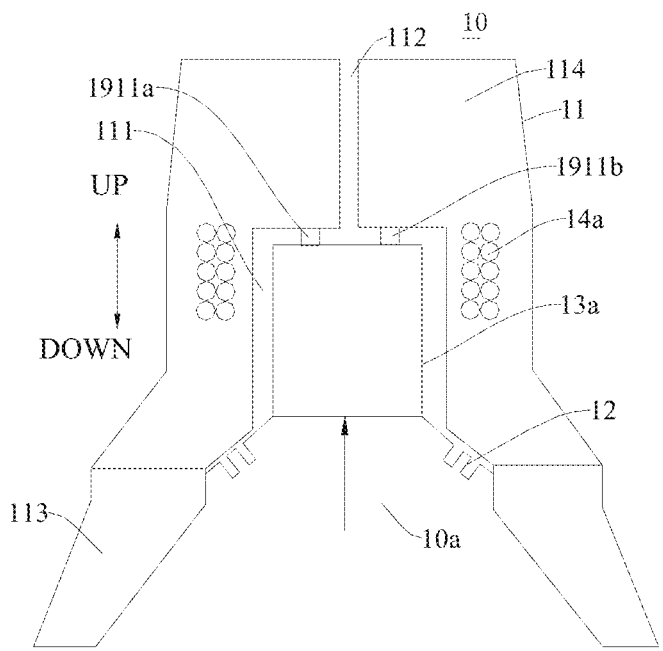
FIG. 17 illustrates a schematic view of the pressure sensor of FIG. 16 in another working state.

As illustrated in FIGS. 16 and 17, the top of the pressure chamber 111 is provided with an overload protection electrode 1921. The overload protection electrode 1921 is configured to cut off the power of the device for increasing the air pressure outside the open end 10a when the top of the movable magnetic core 13a is stopped against the overload protection electrode 1921.

Specifically, when the air pressure outside the open end 10a of the pressure chamber 111 is greater than the air pressure in the pressure chamber 111, the flexible sealing sheet 12 is deformed into the pressure chamber 111 under the pressure difference, and the movable magnetic core 13a moves towards the inside of the pressure chamber 111 along with the deformation of the flexible sealing sheet 12. Then, the first coil 14a generates an inductance change according to the displacement change of the movable magnetic core 13a and causes a resonant frequency change of a sensing circuit. The controller is pre-stored with an air pressure value outside the open end 10a corresponding to the resonant frequency change, and the controller calculates the air pressure outside the open end 10a according to the resonant frequency change. When the air pressure outside the open end 10a of the pressure detection device 10 is overloaded, the movable magnetic core 13a continues to move upwards until it is stopped against the overload protection electrode 1921, and then a heating power of the system is turned off, so that the air pressure outside the open end 10a of the pressure chamber 111 neither is too high nor falls, which can achieve the overload protection for the system and ensure the safe operation of the system.

In some other specific embodiments of the present application, the body portion 11 is substantially formed in a columnar shape with an open lower end. An inner wall of the body portion 11 defines the pressure chamber 111, and an outer wall of the body portion 11 is spaced apart from the inner wall to define an accommodating cavity 114. The first coil 14a is wound around the inner wall and located in the accommodating cavity 114.

Referring to FIG. 16, the body portion 11 is formed in a columnar shape extending along the vertical direction (an up-down direction as shown in FIG. 16), and the body portion 11 internally defines the pressure chamber 111 and the accommodating cavity 114. The pressure chamber 111 is located in the middle of the body portion 11, and the accommodating cavity 114 is formed in an annular shape and fitted over the outside of the pressure chamber 111, that is, the pressure chamber 111 is located in the middle of an area enclosed by the accommodating cavity 114. The first coil 14a is disposed in the accommodating cavity 114 and located at the outer periphery of the pressure chamber 111. The movable magnetic core 13a is disposed in the pressure chamber 111, and during the movement, the movable part 13 has at least a part located inside the first coil 14a.

That is, in this embodiment, the first coil 14a is disposed in the body portion 11, and the movable magnetic core 13a and the first coil 14a have independent installation space, which can facilitate the separate installation of the movable magnetic core 13a and the first coil 14a, avoid exposure of the movable magnetic core 13a and the first coil 14a, and hence protect them. Moreover, the entire structure of the pressure detection device 10 is located in the outer wall of the pressure detection device 10 to realize the modularization of the pressure detection device 10, assemble or disassemble the pressure detection device 10 conveniently, and simplify the installation process of the pressure detection device 10 in a working condition.

A guide groove suitable for the up-and-down movement of the movable magnetic core 13a is defined between an outer peripheral surface of the movable magnetic core 13a and an inner peripheral surface of the inner wall, to ensure a movement path of the movable magnetic core 13a, thereby ensuring the normal operation of the pressure detection device 10 to enable it to accurately detect the pressure value of the open end 10a of the pressure detection device 10 in real time.

Optionally, the body portion 11 is formed as a plastic module. For example, the body portion 11 can be formed by injection molding process, which is easy to process and manufacture, is convenient to form, and has low processing cost and light weight. Moreover, since the body portion 11 is made of a plastic material, which does not interfere with the induction of the first coil 14a and the movable magnetic core 13a, and ensures the normal operation of the pressure detection device 10.

Advantageously, the open end 10a of the body portion 11 has a radial dimension greater than a radial dimension of the pressure chamber 111, which facilitates the introduction of an air flow from the outside of the open end 10a of the pressure chamber 111, thereby allowing the flexible sealing sheet 12 to be deformed in time according to the air pressure outside the open end 10a of the pressure chamber 111 so as to ensure the working sensitivity of the pressure detection device 10.

Optionally, the movable part 13 is formed as the movable electrode 13b disposed on the flexible sealing sheet 12, and the fixed part 14 is formed as the fixed electrode 14b disposed on the top of the pressure chamber 111.

Figure 19:
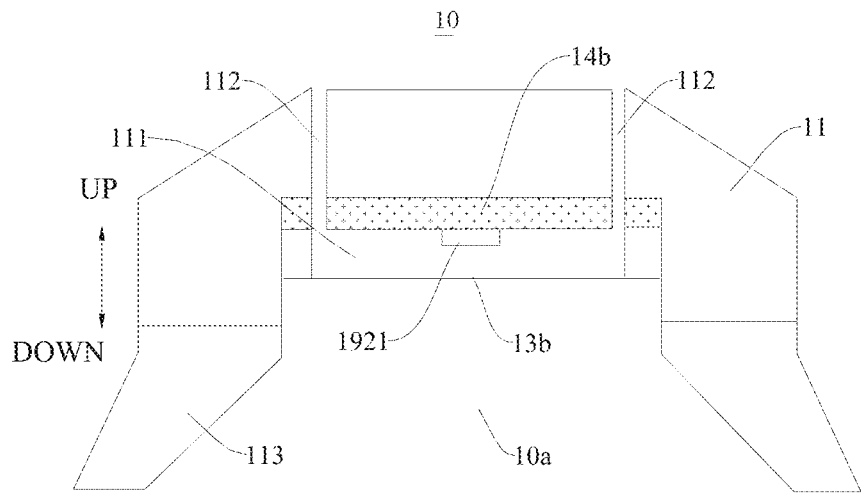
FIG. 19 illustrates a schematic view of a pressure sensor according to still another embodiment of the present application.

Specifically, as illustrated in FIG. 19, the pressure detection device 10 mainly consists of the body portion 11, the movable electrode 13b, the fixed electrode 14b, and the detection unit II. The body portion 11 internally defines the pressure chamber 111 extending along the axial direction thereof (the up-down direction as shown in FIG. 19). One end of the pressure chamber 111 is formed as an open end, while the other end of the body portion 11 is provided with the air hole 112 in communication with the pressure chamber 111. The air hole 112 is in communication with the ambient air. The top wall of the pressure chamber 111 is provided with the fixed electrode 14b, and the open end 10a of the pressure chamber 111 is provided with the movable electrode 13b to close the opening of the pressure chamber 111. When the air pressure outside the open end 10a of the pressure chamber 111 rises, the movable electrode 13b disposed at the open end 10a of the pressure chamber 111 is deformed to generate electromagnetic induction with the fixed electrode 14b. The fixed electrode 14b feeds the sensed deformation of the movable electrode 13b back to the controller of the detection unit II. The controller is pre-stored with an air pressure value outside the open end 10a corresponding to the resonant frequency change, and the controller calculates the air pressure outside the open end 10a according to the resonant frequency change. Thus, the pressure detection device 10 according to the embodiment has a simple structure, relatively few components, and low production cost.

Figure 8:
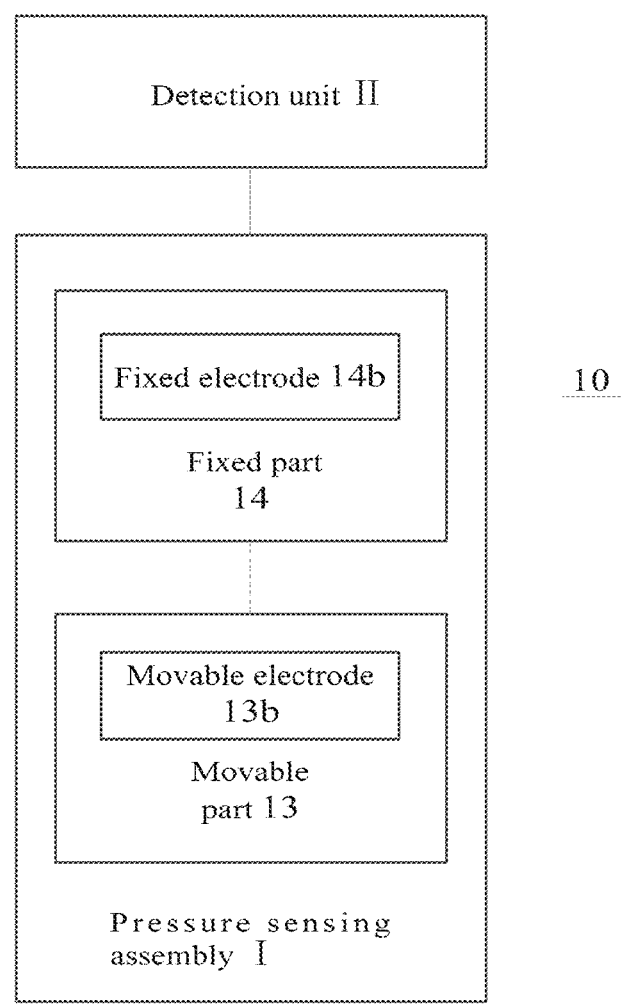
FIG. 8 illustrates a block diagram of a pressure detection device of a pressure cooking appliance according to another embodiment of the present application.

In a specific example of the present application, two air holes 112 are provided and spaced apart on the top of the body portion 11. Referring to FIG. 8, the top of the body portion 11 is provided with two spaced air holes 112, and each air hole 112 is in communication with the pressure chamber 111. When there is a pressure difference between the air pressure outside the open end 10a of the pressure chamber 111 and the air pressure (of the inner cavity) in the pressure chamber 111, for example, when the air pressure outside the open end 10a of the pressure chamber 111 is greater than the air pressure (of the inner cavity) in the pressure chamber 111, the movable electrode 13b is deformed in such a way that at least a part thereof moves upwards. By providing the two air holes 112 in the top of the body portion 11, the external air flow of the system can enter the pressure chamber 111 quickly, thereby ensuring that the external air pressure can be equal to the air pressure in the pressure chamber 111 to guarantee the normal operation of the pressure detection device 10 and further guarantee the accuracy of the pressure value detected by the pressure detection device 10.

It should be noted herein that the air pressure outside the open end 10a of the pressure chamber 111 refers to the air pressure in the sealed cavity, that is, the working pressure of the pressure detection device 10 during use; the external air pressure refers to the air pressure external to the pressure detection device 10, which may be understood as the atmospheric pressure.

Advantageously, the lower surface of the fixed electrode 14b is provided with the overload protection electrode 1921, and the overload protection electrode 1921 is configured to cut off the power of the device for increasing the air pressure outside the open end 10a when at least a part of the movable electrode 13b is stopped against the overload protection electrode 1921.

Specifically, when the movable magnetic core 13a moves upwards until it is stopped against the overload protection electrode 1921 at the top of the pressure chamber 111, the power of the system is turned off, so that the air pressure outside the open end 10a of the pressure chamber 111 (i.e., the air pressure in the sealed cavity) will not be too high, thereby achieving the overload protection for the system and ensuring the safe operation of the system.

The pressure detection device according to embodiments of the present application will be described with reference to FIG. 2 and FIGS. 20-28.

The embodiments of the present application provide the pressure detection device 10 and the cooking appliance. The pressure detection device 10 can be used to detect the pressure intensity in an inner pot of the cooking appliance. The cooking appliance may be a pressure cooker, a microwave oven and so on. A pressure cooker including the pressure detection device 10 is exemplified in detail below.

FIG. 2 illustrates a schematic block diagram of the pressure detection device 10 according to embodiments of the present application. As shown in FIG. 2, the pressure detection device 10 is configured to detect the pressure intensity in a sealed cavity body. The sealed cavity body includes a lid and a housing.

The pressure detection device 10 further includes a pressure sensing assembly I, disposed in the lid and configured to convert the pressure intensity in the sealed cavity body into an electrical signal; a first coupling coil disposed in the lid and connected with the pressure sensing assembly I; and a second coupling coil disposed in the housing and wirelessly coupled with the first coupling coil.

In the above embodiment, the pressure sensing assembly I converts the pressure change into the electrical signal, and the electrical signal is transmitted to the second coupling coil installed in the cooker body 20 via the first coupling coil located in the cooker lid 30; the second coupling coil is connected with a controller (e.g., a control circuit board) of a detection unit II, and the detection of the pressure in the cooker is eventually realized. Since the first coupling coil is wirelessly coupled with the second coupling coil, there is no connecting wire between the cooker lid 30 and the cooker body 20, and hence the cooker lid 30 can be detached at will; moreover, the structure of the sensor is simplified, omitting wireless power supply and wireless data transmission units, and thus the overall cost is low.

Optionally, the pressure sensing assembly I includes a first coil 14a and a movable magnetic core 13a. The movable magnetic core 13a is movable along a central axial direction of the first coil 14a inside the first coil 14a. The first coil 14a is connected with the first coupling coil. Referring to the circuit configuration of FIG. 20, the inductance L in the circuit represents the first coil 14a; the capacitance of a constant value C0 represents the equivalent inductance generated by the first coil 14a; L0 in the figure represents a coupling component; a coil connected at one side of the pressure sensing assembly I is the first coupling coil, while a coil connected at the other side thereof is the second coupling coil. In this embodiment, the movable magnetic core 13a moves along the central axis of the first coil 14a under the action of the pressure inside the pressure cooker. When the movable magnetic core 13a is moving inside the first coil 14a, the inductance of the first coil 14a changes, thereby resulting in a change in a coupling parameter of the first coupling coil and the second coupling coil, and thus the pressure intensity in the pressure cooker can be quickly and accurately obtained according to the change in the coupling parameter.

The pressure sensing assembly I further includes a body portion 11 and a sealing sheet. Specifically, the body portion 11 defines a pressure chamber 111 having an open end, and the body portion 11 is provided with an air hole 112 in communication with the pressure chamber 111. The sealing sheet is disposed at the open end 10a of the body portion 11 to close the open end 10a. The sealing sheet is configured to be deformed towards the pressure chamber 111 when the air pressure outside the open end 10a (i.e., the air pressure in the sealed cavity) is greater than the air pressure in the pressure chamber 111. The movable part 13 is disposed on the sealing sheet and moves according to the deformation of the sealing sheet. The fixed part 14 is spaced apart from the movable part 13, and the fixed part 14 is configured to adapt to the displacement of the movable part 13. The first coupling coil of the detection unit II is connected with the fixed part 14, and the second coupling coil of the detection unit II is connected with a controller of the detection unit II, whereby the air pressure outside the open end 10a (i.e., the air pressure in the sealed cavity) is calculated based on the displacement information sensed by the fixed part 14.

Figure 20:
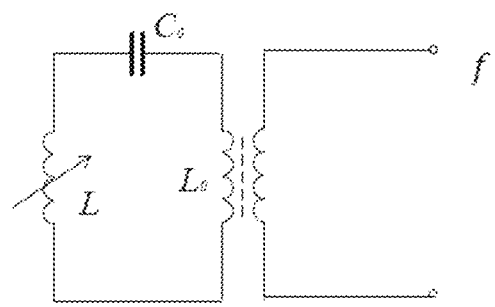
FIG. 20 illustrates a schematic circuit configuration of an inductive pressure sensing assembly of a pressure detection device according to another embodiment of the present application.
Figure 21:
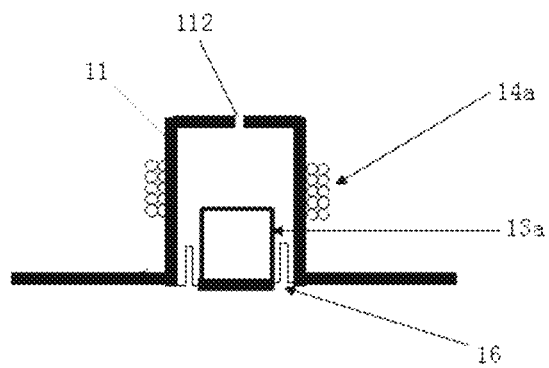
FIG. 21 illustrates a schematic view of an inductive pressure sensing assembly of a pressure detection device according to another embodiment of the present application.

Optionally, corresponding to the circuit configuration shown in FIG. 20, as illustrated in FIG. 21, the body portion 11 may be formed as an insulation cylinder 11 located above a predetermined opening in the top of the cooker lid 30. The first coil 14a is embedded and wound around a middle portion of an outer wall of the insulation cylinder 11. The sealing sheet forms a spring sealing sheet 16, and the bottom of the insulation cylinder 11 is sealed by the spring sealing sheet 16. The movable magnetic core 13a is fixed to a middle portion of an upper surface of the spring sealing sheet 16. The spring sealing sheet 16 drives the movable magnetic core 13a to move up and down, along with the pressure change in the pressure cooker, and the up-and-down movement of the movable magnetic core 13a results in a change in the inductance of the first coil 14a.

The pressure detection device 10 of the pressure cooker in the above embodiment includes the pressure sensing assembly I. The spring sealing sheet 16 at a bottom end of the insulation cylinder 11 seals the opening of the cooker lid 30, and the spring sealing sheet 16 drives the movable magnetic core 13a to move up and down, along with the pressure change in the pressure cooker. The up-and-down movement of the movable magnetic core 13a results in the inductance change of the first coil 14a. In such a case, the pressure sensitive component of the sensor is mechanical, which can measure the pressure directly with quick response and high accuracy.

Specifically, in this embodiment, the top of the insulation cylinder 11 is provided with the air hole 112. Such an arrangement is to discharge the air in the insulation cylinder 11 when the movable magnetic core 13a moves inside the insulation cylinder 11, so that the movement of the movable magnetic core 13a will not be hindered.

Figure 22:
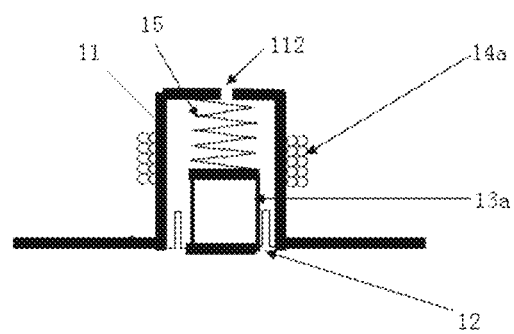
FIG. 22 illustrates a schematic view of an inductive pressure sensing assembly of a pressure detection device according to still another embodiment of the present application.

Optionally, as an embodiment of the present application, corresponding to the circuit configuration shown in FIG. 20, as illustrated in FIG. 22, the body portion 11 is formed as an insulation cylinder 11 located above a predetermined opening in the top of the cooker lid 30. The first coil 14a is embedded and wound around a middle portion of an outer wall of the insulation cylinder 11. The sealing sheet forms a flexible sealing sheet 12, and the bottom of the insulation cylinder 11 is sealed by the flexible sealing sheet 12. The movable magnetic core 13a is fixed to a middle portion of an upper surface of the flexible sealing sheet 12, and the top of the movable magnetic core 13a is connected to the top of the insulation cylinder 11 through a spring 15. The flexible sealing sheet 12 cooperates with the spring 15 to drive the movable magnetic core 13a to move up and down, along with the pressure change in the pressure cooker, and the up-and-down movement of the movable magnetic core 13a results in a change in the inductance of the first coil 14a.

The pressure detection device 10 of the pressure cooker in the above embodiment includes the pressure sensing assembly I. The opening of the cooker lid 30 is sealed by the flexible sealing sheet 12 at the bottom end of the insulation cylinder 11, the movable magnetic core 13a is fixed to the middle portion of the upper surface of the flexible sealing sheet 12, and the top of the movable magnetic core 13a is connected to the top of the insulation cylinder 11 through the spring 15. The flexible sealing sheet 12 cooperates with the spring 15 to drive the movable magnetic core 13a to move up and down, along with the pressure change in the pressure cooker, and the up-and-down movement of the movable magnetic core 13a results in the inductance change of the first coil 14a. In such a case, the pressure sensitive component of the sensor is mechanical, which can measure the pressure directly with quick response and high accuracy.

Specifically, in this embodiment, the top of the insulation cylinder 11 is provided with the air hole 112. Such an arrangement is used to discharge the air in the insulation cylinder 11 when the movable magnetic core 13a moves inside the insulation cylinder 11, so that the movement of the movable magnetic core 13a will not be hindered.

Figure 23:
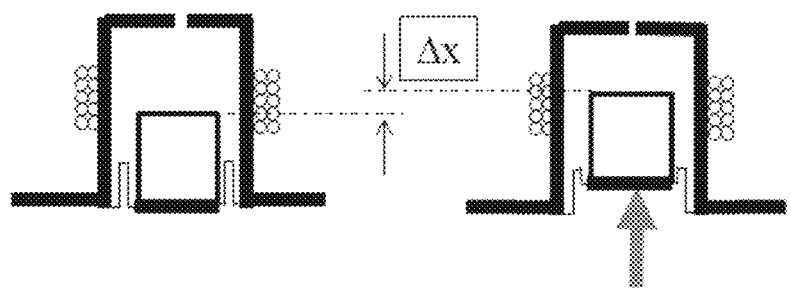
FIG. 23 is a schematic view showing a change of the pressure sensing assembly during a pressure detection process according to the embodiment of FIG. 21 of the present application.
Figure 24:
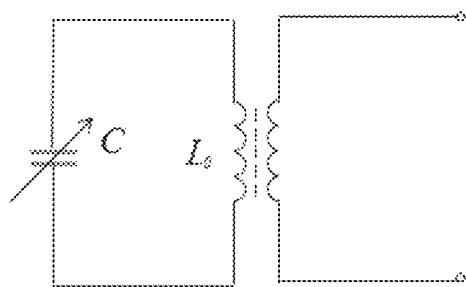
FIG. 24 illustrates a schematic circuit configuration of a capacitive pressure sensing assembly of a pressure detection device according to an embodiment of the present application.

As illustrated in FIG. 23, the spring sealing sheet 16 drives the movable magnetic core 13a to move up and down, along with the pressure change in the pressure cooker. The movable magnetic core moves upwards by $\Delta X$ in FIG. 23, and according to mechanics formulae, $F=PA=k\Delta X$ and $\Delta X=PA/k$ are known.

In the formulae, P refers to the pressure intensity in the cooker, A represents a pressure sensing area, and K is a spring coefficient.

Figure 29:
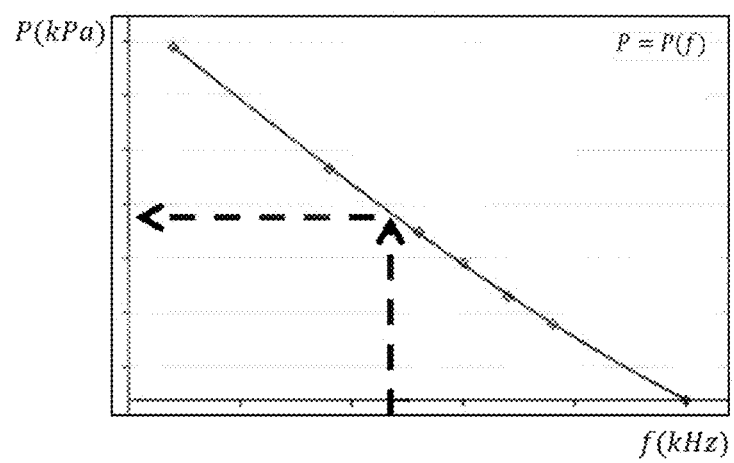
FIG. 29 is a graph showing pressure intensity in a cooker body of a pressure cooker and a resonant frequency change of a resonant circuit according to embodiments of the present application.
Figure 30:
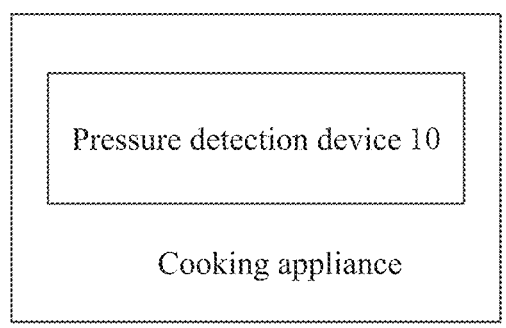
FIG. 30 illustrates a block diagram of a cooking appliance according to embodiments of the present application.

The pressure cooker generates the pressure intensity P. The spring sealing sheet is subjected to an outward thrust F=PA. The spring sheet is deformed to cause an outward displacement ($\Delta x=PA/k$) of the movable magnetic core 13a. The displacement $\Delta X$ of the movable magnetic core 13a results in an inductance change $\Delta L$ of the sensing coil. The inductance change $\Delta L$ of the sensing coil in turn causes a resonant frequency change of the sensing circuit. Thus, the correspondence relationship between the pressure intensity P in the cooker and the resonant frequency f of the sensing circuit is as shown in FIG. 29, and the correspondence relationship between the pressure intensity P in the cooker and the coupling parameter (like the resonant frequency) is preferentially stored in the control chip microcomputer. In practical applications, the control system detects the resonant frequency f of the sensing circuit through mutual inductance, such that the chip microcomputer can calculate the pressure in the cooker.

Optionally, as an embodiment of the present application, the pressure sensing assembly I includes a capacitor C that has a variable capacitance according to the pressure change in the pressure cooker. Referring to the circuit configuration shown in FIG. 24, L0 represents a coupling component in the figure, a coil connected at one side of the pressure sensing assembly I is the first coupling coil, while a coil connected at the other side thereof is the second coupling coil. In this embodiment, one electrode of the capacitor C moves up and down under the action of the pressure in the pressure cooker, causing the capacitance of the capacitor C to change and hence the coupling parameter of the first coupling coil and the second coupling coil to change. The pressure intensity in the pressure cooker can be obtained quickly and accurately based on the change of the coupling parameter.

Figure 25:
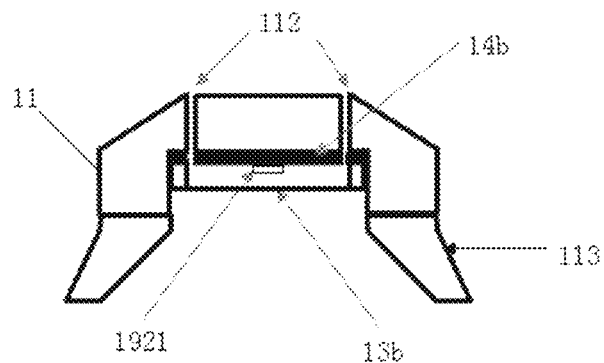
FIG. 25 illustrates a schematic sectional view of a capacitive pressure sensing assembly of a pressure detection device according to an embodiment of the present application.

Optionally, as an embodiment of the present application, as illustrated in FIG. 25, the body portion 11 is formed as an insulation cylinder 11 located above a predetermined opening in the top of the cooker lid 30. The bottom of the insulation cylinder 11 is sealed by the movable electrode 13b, and the movable electrode 13b moves up and down along with the pressure change in the pressure cooker. The top of the insulation cylinder 11 is provided with the fixed electrode 14b in a position corresponding to the movable electrode 13b. In this embodiment, one electrode of the capacitor C moves up and down under the action of the pressure in the pressure cooker, causing the capacitance of the capacitor C to change and hence the coupling parameter of the first coupling coil and the second coupling coil to change. The pressure intensity in the pressure cooker can be obtained quickly and accurately based on the change of the coupling parameter. In such a case, the pressure sensitive component of the sensor is mechanical, which can measure the pressure directly with quick response and high accuracy.

Specifically, in this embodiment, the top of the insulation cylinder 11 is provided with the air hole 112, and the position of the air hole 112 is offset from the position of the fixed electrode 14b.

Figure 26:
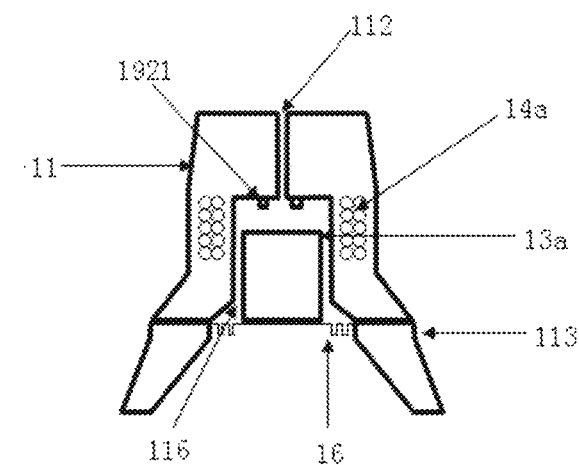
FIG. 26 illustrates a schematic sectional view of an inductive pressure sensing assembly of a pressure detection device according to another embodiment of the present application.
Figure 27:
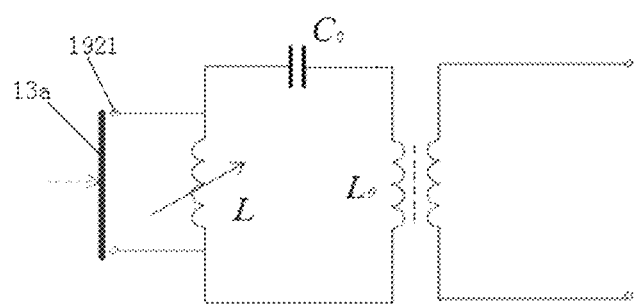
FIG. 27 illustrates a schematic circuit configuration in a case of a short circuit of an overload protection electrode according to embodiments of the present application.
Figure 28:
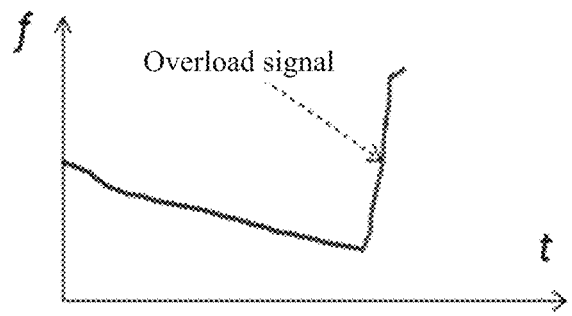
FIG. 28 is a graph showing a change in a resonant frequency in a case of overloading according to embodiments of the present application.

Optionally, as an embodiment of the present application, as illustrated in FIG. 26, an overload protection electrode 1921 is fixed on the top of the insulation cylinder 11. When the movable magnetic core 13a moves along a magnetic core movement guiding groove 116 and comes into contact with the overload protection electrode 1921, the overload protection electrode 1921 is short-circuited, and the first coil 14a is short-circuited.

In the above embodiment, when the pressure in the inner pot reaches or exceeds the maximum design pressure, the displacement of the movable magnetic core 13a achieves the maximum contact with the overload protection electrode

1921, such that the overload protection electrode 1921 is short-circuited, and the first coil 14*a* is short-circuited (see FIG. 27); the coupling parameter abruptly changes, for example, an abrupt increase of the resonant frequency (see FIG. 28), and the control circuit board detects that the resonant frequency is suddenly increased, in which case the heating power supply is controlled to cut off to ensure the safety of the pressure cooker.

Optionally, as an embodiment of the present application, as illustrated in FIG. 25, an overload prevention electrode 1921 is fixed on the top of the insulation cylinder 11. When the movable electrode comes into contact with the overload prevention electrode 1921, the overload prevention electrode is short-circuited and the capacitor C is short-circuited.

In the above embodiment, when the pressure in the inner pot reaches or exceeds the maximum design pressure, the displacement of the movable electrode achieves the maximum contact with the overload prevention electrode 1921, such that the overload prevention electrode 1921 is short-circuited, and hence the capacitor is short-circuited. The coupling parameter abruptly changes, and for example, the resonant frequency is suddenly increased, and the control circuit board detects the sudden increase of the resonant frequency, such that the heating power supply is controlled to cut off to ensure the safety of the pressure cooker.

Optionally, as an embodiment of the present application, the insulation cylinder 11 of the pressure detection device 10 is integrally formed with the cooker lid 30, or fixed to the cooker lid 30 through a connection block. The connection block may adopt a mounting screw or a mounting stud.

The pressure cooker and the pressure detection device 10 in the pressure cooker according to the embodiments of the present application are described in detail above with reference to FIGS. 20 to 29. A pressure detection system in the pressure cooker according to embodiments of the present application will be described in detail below with reference to FIG. 31.

Figure 18:
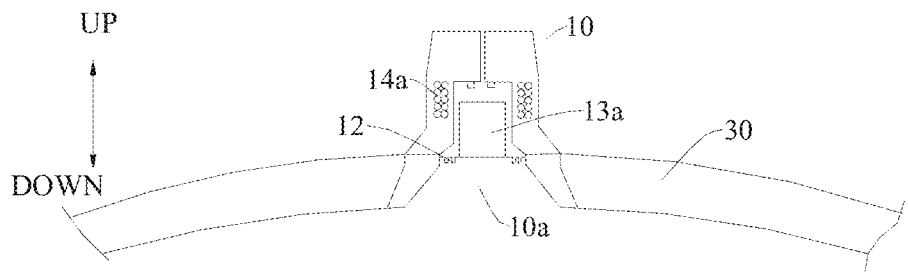
FIG. 18 illustrates an assembly diagram of the pressure sensor of FIG. 16 and a cooker lid.
Figure 31:
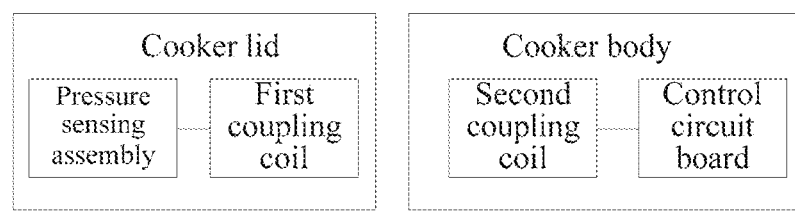
FIG. 31 illustrates a schematic block diagram of a pressure detection system of a pressure cooker according to embodiments of the present application.

FIG. 31 illustrates a schematic block diagram of a pressure detection system of a pressure cooker according to an embodiment of the present application. FIG. 12 is a schematic view showing the positional relationship between the pressure detection device 10 and the cooker lid 30. As illustrated in FIG. 18, the pressure detection device 10 is fixed to the cooker lid 30. As illustrated in FIG. 31, the pressure detection system of the pressure cooker includes the pressure detection device 10 installed on the cooker lid 30, and further includes a control circuit board fixed in the cooker body 20 of the pressure cooker. The pressure detection device 10 includes: the pressure sensing assembly I configured to convert the pressure intensity in the pressure cooker into the electrical signal; the first coupling coil disposed on or within the cooker lid 30, in which the pressure sensing assembly I is connected with the first coupling coil; and the second coupling coil disposed in or within the cooker body 20. When the cooker lid 30 covers the cooker body 20, the first coupling coil and the second coupling coil are wirelessly coupled. The second coupling coil of the pressure detection device 10 is connected with the control circuit board.

The pressure sensing assembly I converts the pressure intensity in the pressure cooker into the electrical signal.

The control circuit board detects a coupling parameter of the first coupling coil and the second coupling coil, and calculates the pressure intensity in the cooker according to the coupling parameter.

In the above embodiment, the pressure sensing assembly I converts the pressure intensity in the pressure cooker into the electrical signal, and the electrical signal is transmitted to the second coupling coil installed within the cooker body 20 via the first coupling coil located within the cooker lid 30. The second coupling coil is connected with the control circuit board, such that the pressure intensity in the cooker is finally detected in a passive and wireless manner. Since the sensor is wireless and passive, there is no connecting wire between the cooker lid 30 and the cooker body 20, and hence the cooker lid 30 can be detached at will; moreover, the structure of the sensor is simplified, omitting wireless power supply and wireless data transmission units, and thus the overall cost is low.

It should be understood that the control circuit board in this embodiment is pre-stored with the correspondence relationship between the pressure intensity P in the cooker and the coupling parameter, such that the pressure intensity P can be acquired quickly after the control circuit board obtains the coupling parameter.

It should be understood that the coupling parameter in this embodiment includes the resonance spectrum and the loop current of the coupling coil.

In this embodiment, when an inductive pressure sensing assembly I is adopted as the pressure sensing assembly I of the pressure detection device 10, and the coupling parameter refers to the resonant frequency, the resonant frequency can be calculated as $$f = f_0 + \Delta f = \frac{1}{2\pi\sqrt{(\Delta L + L + L_0)C}}.$$

In the formula, f is the current resonant frequency, f0 is the initial resonant frequency, $\Delta f$ is the resonant frequency change, $\Delta L$ is the inductance change, L is the initial inductance of the first coil 14*a*, L0 is the inductance of the coupling coil, and C is the capacitance of the capacitor having a constant value.

The relationship between the pressure intensity P in the pressure cooker and the inductance change as well as the resonant frequency can be expressed by the following equation, i.e., P=P ($\Delta L$)=P (f), in which the relationship between the resonant frequency and the pressure intensity P in the pressure cooker is as shown in FIG. 29. It can be seen from FIG. 29 that the pressure intensity and the resonant frequency change substantially linearly.

Optionally, as an embodiment of the present application, the cooking appliance may be other cooking appliances besides the pressure cooker. The cooking appliance includes a sealed cavity body and the pressure detection device 10, in which the pressure detection device 10 is configured to detect the pressure intensity in the sealed cavity body. The pressure detection device 10 further includes the pressure sensing assembly I configured to convert the pressure intensity in the sealed cavity body into the electrical signal; the first coupling coil connected with the pressure sensing assembly I; and the second coupling coil disposed in or within the cooker body 20. The first coupling coil and the second coupling coil are wirelessly coupled. The positions of the first coupling coil and the second coupling coil can be determined as required. The first coupling coil and the second coupling coil may be located within the same component or different components of the cooking appliance. For example, the first coupling coil and the second coupling coil are disposed in the cooker lid and the cooker body of the cooking appliance, respectively, thereby realizing the wireless connection between the cooker lid and the cooker body.

Specifically, in this embodiment, the pressure sensing assembly I includes the first coil 14a and the movable magnetic core. The movable magnetic core is movable along the central axial direction of the first coil 14a within the first coil 14a. The first coil 14a is connected with the first coupling coil.

Specifically, in this embodiment, the pressure sensing assembly I includes an insulation cylinder 11 located above a predetermined opening in the top of the sealed cavity body. The first coil 14a is embedded and wound around a middle portion of an outer wall of the insulation cylinder 11. The bottom of the insulation cylinder 11 is sealed by a spring sealing sheet 16. The movable magnetic core 13a is fixed to a middle portion of an upper surface of the spring sealing sheet 16. The spring sealing sheet 16 drives the movable magnetic core 13a to move up and down, along with the pressure change in the sealed cavity body, and the up-and-down movement of the movable magnetic core 13a results in a change in the inductance of the first coil 14a.

Specifically, in this embodiment, an overload protection electrode 1921 is fixed on the top of the insulation cylinder 11. When the movable magnetic core 13a comes into contact with the overload protection electrode 1921, the overload protection electrode 1921 is short-circuited, and the first coil 14a is short-circuited. The top of the insulation cylinder 11 is provided with the air hole 112.

Optionally, as an embodiment of the present application, the pressure sensing assembly I includes an insulation cylinder 11 located above a predetermined opening in the top of the sealed cavity body. The first coil 14a is embedded and wound around a middle portion of an outer wall of the insulation cylinder 11. The bottom of the insulation cylinder 11 is sealed by a flexible sealing sheet 12. The movable magnetic core 13a is fixed to a middle portion of an upper surface of the flexible sealing sheet 12, and the top of the movable magnetic core 13a is connected to the top of the insulation cylinder 11 through a spring 15. The flexible sealing sheet 12 cooperates with the spring 15 to drive the movable magnetic core 13a to move up and down, along with the pressure change in the sealed cavity body, and the up-and-down movement of the movable magnetic core 13a results in the inductance change of the first coil 14a.

Specifically, in this embodiment, an overload protection electrode 1921 is fixed on the top of the insulation cylinder 11. When the movable magnetic core 13a comes into contact with the overload protection electrode 1921, the overload protection electrode 1921 is short-circuited, and the first coil 14a is short-circuited. The top of the insulation cylinder 11 is provided with the air hole 112.

Optionally, as an embodiment of the present application, the pressure sensing assembly I includes a capacitor that has a variable capacitance according to the pressure change in the sealed cavity body.

Specifically, in this embodiment, the pressure sensing assembly I includes an insulation cylinder 11 located above a predetermined opening in the top of the sealed cavity body. The bottom of the insulation cylinder 11 is sealed by the movable electrode 13b, and the movable electrode 13b moves up and down along with the pressure change within the sealed cavity body. The top of the insulation cylinder 11 is provided with the fixed electrode 14b in a position corresponding to the movable electrode 13b.

Specifically, in this embodiment, an overload prevention electrode 1921 is fixed on the top of the insulation cylinder 11. When the movable electrode 13b comes into contact with the overload prevention electrode 1921, the overload prevention electrode 1921 is short-circuited and the capacitor is short-circuited.

Specifically, in this embodiment, the top of the insulation cylinder 11 is provided with the air hole 112, and the position of the air hole 112 is offset from the position of the fixed electrode 14b.

Specifically, in this embodiment, the insulation cylinder 11 is integrally formed with the sealed cavity body, or the insulation cylinder 11 is fixed to the sealed cavity body through a connection block 113.

Specifically, in this embodiment, a control circuit board fixed within the cooking appliance is also included. The control circuit board is connected with the second coupling coil. The pressure sensing assembly I converts the pressure intensity in the sealed cavity body into the electrical signal. The control circuit board detects the coupling parameter of the first coupling coil and the second coupling coil, and the pressure intensity in the sealed cavity body is calculated according to the coupling parameter. In this embodiment, the electrical signal includes inductance and capacitance. The control circuit board is pre-stored with the correspondence relationship between the pressure intensity in the sealed cavity body and the coupling parameter. The coupling parameter includes the resonance spectrum and the loop current of the coupling coil.

The cooking appliance according to embodiments of a second aspect of the present application will be described in detail with reference to FIGS. 29-36.

The cooking appliance according to embodiments of the present application includes a cooker body 20, a cooker lid 30, and the pressure detection device 10 according to the above embodiments. The cooker body 20 defines a cavity therein, and the cooker lid 30 is movably disposed on the cooker body 20 to open or close the cavity. The body portion 11, the flexible sealing sheet 12, the movable part 13, and the fixed part 14 are disposed to the cooker lid 30. At least a part of the detection unit II is disposed to the cooker body 20.

Therefore, by means of the pressure detection device 10 disposed to the cooking appliance, during the operation of the cooking appliance, the pressure detection device 10 can accurately detect the air pressure of the inner cavity of the cooker body 20 of the cooking appliance in real time, thereby realizing the detection of the working condition of the cooking appliance and ensuring the normal operation of the cooking appliance. Moreover, the pressure detection device 10 has the simple and compact structure with simple wire connection, is conducive to simplifying the structure of the cooking appliance and the wire installation procedure, i.e., simplifying the assembly of the cooker body 20 and the cooker lid 30 of the cooking appliance, so as to reduce the production difficulty of the cooking appliance and enhance the production efficiency of the cooking appliance.

The detection unit II includes a first coupling coil and a second coupling coil. The first coupling coil is disposed in the cooker lid 30 of the cooking appliance, while the second coupling coil is disposed in the cooker body 20 of the cooking appliance. The second coupling coil is connected with the controller of the detection unit II and wirelessly coupled with the first coupling coil. The first coupling coil is disposed to the cooker lid 30 and connected with the pressure sensing assembly I.

For the cooking appliance of the present application, the pressure sensing assembly I converts the pressure in the sealed cavity into the electrical signal, and the electrical signal is transmitted to the second coupling coil via the first coupling coil. The second coupling coil is connected with the controller (e.g., a control circuit board) of the detection unit II, and the passive and wireless detection of the cooking appliance is finally achieved. Since the pressure detection device 10 is wireless and passive, there is no connecting wire between the cooker lid 30 and the pressure sensing assembly I, and hence the cooker lid 30 can be detached at will; moreover, the structure is simple and omits wireless power supply and wireless data transmission units, and thus the overall cost is low.

A pressure cooker A according to embodiments of the present application will be described in detail by way of example and with reference to FIGS. 12-19 and FIGS. 29-36.

The pressure cooker A according to embodiments of the present application includes the cooker body 20, the cooker lid 30, and the pressure detection device 10 according to the above embodiments. The cooker body 20 defines a cavity therein, and the cooker lid 30 is movably disposed on the cooker body 20 to open or close the cavity. The body portion 11, the flexible sealing sheet 12, the movable part 13, and the fixed part 14 are disposed to the cooker lid 30. The first coupling coil of the detection unit II is disposed to the cooker lid 30, the second coupling coil of the detection unit II is disposed in the cooker body 20, and the controller of the detection unit II is disposed to the cooker body 20.

In other words, the pressure cooker A mainly consists of the cooker body 20, the cooker lid 30 and the pressure detection device 10. The cooker body 20 internally defines a cavity with an open upper end, and an inner pot is disposed in the cavity. A user may place or fetch the inner pot through the open end of the cooker body 20. The cooker lid 30 is movably disposed on an upper end of the cooker body 20 to open or close the cavity. The body portion 11, the flexible sealing sheet 12, the movable part 13 and the fixed part 14 of the pressure detection device 10 are disposed to the cooker lid 30 of the pressure cooker A. The second coupling coil of the detection unit II is disposed to the cooker body 20.

When the pressure cooker A is working, the pressure in the cavity of the pressure cooker A gradually rises. When the air pressure in the cavity of the pressure cooker A is greater than the air pressure in the pressure chamber 111 of the body portion 11 of the pressure detection device 10, the flexible sealing sheet 12 of the body portion 11 is deformed due to a pressure difference at both sides of the flexible sealing sheet 12, and the movable part 13 is driven to move towards the inner cavity of the pressure chamber 111. During this process, the fixed part 14 can sense the displacement information of the movable part 13, and then convert the sensed displacement information into an electrical signal. The change in the inductance/capacitance is transmitted to the second coupling coil installed within the cooker body 20 by means of the first coupling coil located within the cooker lid 30. Since the second coupling coil is connected with the controller, the signal is fed back to the controller. The controller acquires the air pressure outside the pressure detection device 10 based on the received displacement information, that is, the controller acquires the air pressure in the inner cavity of the cavity of the pressure cooker A based on the received displacement information.

For example, as illustrated in FIGS. 16-18, when the movable part 13 of the pressure detection device 10 is formed as the movable magnetic core 13a, the fixed part 14 is the first coil 14a, and the flexible sealing sheet 12 is formed as the sealing spring sheet. The sealing spring sheet has an elastic coefficient of k, the pressure sensing area is denoted by A, and the pressure intensity generated in the cavity of the cooker body 20 of the pressure cooker A is denoted by P. The sealing spring sheet of the pressure detection device 10 is subjected to an outward thrust by the air pressure in the cavity of the cooker body 20, in which the outward thrust is F=PA. The sealing spring sheet is deformed under the action of the air pressure in the cavity of the cooker body 20, and drives the movable magnetic core 13a to move upwards by x=F/k=PA/k. The displacement x of the movable magnetic core 13a causes the inductance change L of the first coil 14a, and the inductance change L of the first coil 14a in turn causes the resonant frequency change f of the sensing circuit, so that the pressure intensity P in the cooker body 20 and the resonant frequency f of the sensing circuit have a relationship as shown by the graph in FIG. 29. The relationship is pre-stored in the controller (for example, a chip microcomputer) of the detection unit II of the pressure detection device 10. In practical applications, the control system measures the resonant frequency change f of the sensing circuit through the mutual inductance principle, and the controller can calculate the air pressure in the cooker body 20 of the pressure cooker according to the above relationship, in which the measured pressure value has high accuracy.

Therefore, by providing the pressure cooker A with the pressure detection device 10, when the pressure cooker A is working, the pressure detection device 10 can accurately detect the air pressure in the inner cavity of the cooker body 20 of the pressure cooker A in real time, thereby realizing the detection of the working state of the pressure cooker A and ensuring the normal operation of the pressure cooker A. Moreover, the pressure detection device 10 has the simple and compact structure with simple wire connection, is conducive to simplifying the structure of the pressure cooker A and the wire installation procedure, i.e., simplifying the assembly of the cooker body 20 and the cooker lid 30 of the pressure cooker A, so as to reduce the production difficulty of the pressure cooker A and enhance the production efficiency of the pressure cooker A.

Optionally, the cooker lid 30 is flippably connected with the cooker body 20. The detection unit II is in wired connection or wireless connection with the fixed part 14. Specifically, as illustrated in FIGS. 32 and 33, in this embodiment, the cooker lid 30 is pivotably connected to a side of the cooker body 20 to open or close the open end of the cavity.

The controller of the detection unit II of the pressure detection device 10 is disposed in the cooker body 20, while the fixed part 14 of the pressure detection device 10 is disposed in the cooker lid 30 of the pressure cooker A and can be connected with the controller of the detection unit II through a wire. For example, the wire is provided at a position where the cooker lid 30 pivots relative to the cooker body 20, and two ends of the wire are connected with the fixed part 14 and the controller respectively to ensure the signal transmission between the fixed part 14 and the controller. Since the pressure detection device 10 has the simple and compact structure with simple wire connection, it is conducive to simplifying the structure of the pressure cooker A and the wire installation procedure, thereby reducing the production difficulty of the pressure cooker A and enhancing the production efficiency of the pressure cooker A.

Certainly, the present application is not limited thereto. The controller of the pressure detection device 10 can be wirelessly connected with the fixed part 14, which can also ensure the signal transmission between the controller and the fixed part 14. Due to the wireless connection between the controller and the fixed part 14, on the basis of guaranteeing the signal transmission between the controller and the fixed part 14, the connection manner between the cooker lid 30 and the cooker body 20 of the pressure cooker A can be simplified, i.e., the installation positions of the cooker body 20 and the cooker lid 30 of the pressure cooker A will not affect the electromagnetic induction of the internal structure of the pressure detection device 10, that is, it will not affect the normal operation of the pressure detection device 10. On the basis of guaranteeing the normal operation of the pressure detection device 10, the connection process between the cooker lid 30 and the cooker body 20 of the pressure cooker A is reduced, thereby improving the production efficiency of the pressure cooker A.

Optionally, the cooker lid 30 is detachably connected with the cooker body 20, and the controller is wirelessly connected with the fixed part 14. Specifically, as illustrated in FIG. 34, the cooker lid 30 and the cooker body 20 of the pressure cooker A are connected in a detachable manner; the controller is connected with the second coupling coil of the detection unit II; the fixed part 14 is connected with the first coupling coil of the detection unit II; and the controller of the detection unit II achieves the wireless connection with the fixed part 14 by means of the first coupling coil and the second coupling coil of the detection unit II. When the pressure cooker A is in use, the cooker lid 30 can be snap-fitted with the pot body 20 to close the open end of the cavity of the cooker body 20, to ensure the normal operation of the pressure cooker A. when the pressure cooker A is not in use, the cooker lid 30 can be removed from the cooker body 20, and at this time, the pressure detection device 10 is not working, such that it is convenient to clean the cooker body 20 and the cooker lid 30 separately, thereby ensuring the cleaning effect on the pressure cooker A.

In one embodiment, the cooker lid 30 is provided with a columnar handle, and the columnar handle is formed as the body portion 11, thereby utilizing the internal space of the cooker lid 30 effectively. Referring to FIG. 34, the middle portion of the cooker lid 30 is provided with the columnar handle protruding from an outer surface of the cooker lid 30. The columnar handle extends substantially in an axial direction of the cooker lid 30 (the up-down direction as shown in FIG. 34). The columnar handle internally defines a pressure chamber 111 having an open lower end. The columnar handle has a lower end provided with the flexible sealing sheet 12 to close the lower opening of the pressure chamber 111, and an upper end provided with the air hole 112 to be communicated with the pressure chamber 111 and the outside atmosphere.

When the pressure in the cavity of the pressure cooker A is greater than the pressure in the pressure chamber 111, that is, the pressure in the cavity of the pressure cooker A is greater than the external atmospheric pressure, the flexible sealing sheet 12 is deformed, and drives the movable part 13 disposed on the flexible sealing sheet 12 to move upwards. The fixed part 14 senses the movement of the movable part 13, and converts the sensed displacement information of the movable part 13 into the electrical signal. The change in the inductance/capacitance is transmitted to the second coupling coil installed within the cooker body 20 by means of the first coupling coil located within the cooker lid 30. Since the second coupling coil is connected with the controller, the signal is fed back to the controller. The controller acquires the air pressure in the cavity of the cooker body 20 of the pressure cooker 20 based on the received displacement information. Due to the wireless connection between the first coupling coil and the second coupling coil, the passive and wireless detection of the pressure in the cooker is finally realized.

Certainly, the installation position of the pressure detection device 10 according to the present application is not limited thereto. The pressure detection device 10 may be provided at an off-center position of the cooker lid 30 of the pressure cooker A, to avoid scalding the user's hand due to high-temperature steam leakage from the cooker body 20 when the flexible sealing sheet is damaged.

Further, the top of the pressure chamber 111 of the columnar handle is also provided with an overload protection electrode 1921. When at least a part of the movable part 13 abuts against the overload protection electrode 1921, the power supply for increasing the air pressure in the cavity of the cooker body 20 of the pressure cooker A is cut off, to maintain the air pressure in the cavity of the pressure cooker A at a constant air pressure or decrease it, thereby achieving the overload protection of the pressure cooker A, ensuring the normal operation of the pressure cooker A, avoiding damage due to too high working pressure, and guaranteeing safe and reliable use.

Optionally, the body portion 11 is integrally formed with the cooker lid 30. Thus, the integrally formed structure can not only guarantee the structure and performance stability of the pressure cooker A, but also facilitate formation and manufacturing by eliminating redundant fittings and connection processes, thereby greatly improving the assembling efficiency of the pressure cooker A, and ensuring the reliability of connection between the body portion 11 and the cooker lid 30. In addition, the overall strength and stability of the integrally formed structure is higher, the assembling is more convenient, and the service life is longer.

In some specific examples of the present application, the cooker lid 30 is provided with a strip handle (not shown), and the strip handle spans two sides of the cooker lid 30. The pressure detection device 10 is disposed at one side of the strip handle.

Specifically, the strip handle can extend along a radial direction of the cooker lid 30, and have two ends connected with an upper surface of the cooker lid 30 separately. One end of the strip handle is located at one side of the center of the cooker lid 30, while the other end of the strip handle is located at the other side of the center of the cooker lid 30.

Further, the strip handle internally defines a chamber for installing the pressure detection device 10. The pressure detection device 10 is disposed in the chamber and located at a side of the strip handle. For example, the pressure detection device 10 can be disposed adjacent to the end of the strip handle. Thus, the structure is simple, the assembling is convenient, and the space within the strip handle is utilized effectively, thereby improving the space utilization rate.

In some other specific embodiments of the present application, the body portion 11 is connected with the cooker lid 30 through a screw. Specifically, a suitable pressure detection device 10 may be chosen according to the power, model or the like of the pressure cooker A, to make the replacement convenient, the assembly or disassembly simple, and the maintenance convenient.

Two sides of the open end 10a of the body portion 11 are separately provided with a connection block 113 obliquely extending downwards and outwards. The connection block 113 has an upper end connected with the body portion 11 and an outer side connected with the cooker lid 30.

Referring to FIG. 32, the body portion 11 is formed in a columnar shape extending along the vertical direction, and the lower end of the body portion 11 forms the open end 10a. The lower end of the body portion 11 is provided with connection blocks 113 arranged oppositely. When the pressure detection device 10 is to be assembled with the cooker lid 30 of the pressure cooker A, the connection blocks 113 of the body portion 11 are connected with the cooker lid 30 to realize the assembly of the pressure detection device 10 and the cooker lid 30 of the pressure cooker A.

Advantageously, a passage is defined between the connection blocks 113 and communicated with the open end 10a. A lower end of the passage has a radial dimension greater than a radial dimension of an upper end of the passage, and the radial dimension of the upper end of the passage is in turn greater than the radial dimension of the open end 10a.

Specifically, as illustrated in FIGS. 16 and 17, in combination with FIG. 18, the lower end of the body portion 11 is provided with the connection blocks 113, the cooker lid 30 of the pressure cooker A is provided with an installation opening, and the connection blocks 113 can be assembled with the cooker lid 30 of the pressure cooker A through threaded connection. The passage is defined between the connection blocks 113, and the passage is communicated with the outside of the open end 10a of the pressure chamber 111 and the inner cavity of the cooker body 20 of the pressure cooker A. Thus, it is ensured that the air flow in the inner cavity of the cooker body 20 of the pressure cooker A can flow to the outside of the open end 10a of the pressure detection device 10 through the passage, so as to facilitate the detection of the air pressure in the inner cavity of the cooker body 20 of the pressure cooker A by the pressure detection device 10.

Further, in the axial direction of the pressure detection device 10, the radial dimension of the lower end of the passage is greater than that of the upper end of the passage, and the radial dimension of the upper end of the passage is greater than that of the open end 10a of the pressure chamber 111, such that it is ensured that the air flow in the inner cavity of the cooker body 20 of the pressure cooker A can be guided and quickly act on the flexible sealing sheet 12 of the pressure detection device 10, and hence it is ensured that the pressure detection device 10 can quickly detect the air pressure value in the inner cavity of the cooker body 20 of the pressure cooker A in real time in a safe and reliable manner.

FIG. 35 illustrates a schematic flow chart of a pressure detection method for a pressure cooker according to an embodiment of the present application. As illustrated in FIG. 35, in the pressure detection method for the pressure cooker, the pressure cooker includes the cooker body 20 and the cooker lid 30, and further includes the pressure detection device 10. The pressure detection device 10 includes the pressure sensing assembly I configured to convert the pressure intensity in the pressure cooker into the electrical signal; the first coupling coil disposed on or within the cooker lid 30, in which the pressure sensing assembly I is connected with the first coupling coil; and the second coupling coil disposed in or within the cooker body 20. When the cooker lid 30 covers the cooker body 20, the first coupling coil and the second coupling coil are wirelessly coupled. The second coupling coil is connected with the control circuit board. The method includes the following steps: converting the pressure intensity in the pressure cooker into the electrical signal by the pressure sensing assembly I; detecting the coupling parameter of the first coupling coil and the second coupling coil and calculating the pressure intensity in the pressure cooker according to the coupling parameter by the control circuit board.

In the above embodiment, the pressure intensity in the pressure cooker is converted into the electrical signal through the pressure sensing assembly I of the pressure detection device 10. Then, the change in the inductance/capacitance is transmitted to the second coupling coil installed within the cooker body 20 through the first coupling coil located within the cooker lid 30. Since the second coupling coil is connected with the controller, the passive and wireless detection of the pressure in the cooker is finally realized. Since the sensor is wireless and passive, there is no connecting wire between the cooker lid 30 and the cooker body 20, and hence the cooker lid 30 can be detached at will; moreover, the structure of the sensor is simplified, omitting wireless power supply and wireless data transmission units, and thus the overall cost is low.

FIG. 36 illustrates a schematic flow chart of an overvoltage protection detecting method according to an embodiment of the present application. As illustrated in FIG. 36, in this embodiment, the pressure cooker further includes an overload protection electrode, and the overload protection electrode is fixed at the end of the pressure sensing assembly I. when the pressure intensity in the pressure cooker achieves a predetermined value, the pressure sensing assembly I contacts the overload protection electrode, and the overload protection electrode is short-circuited. In such a case, the control circuit board detects that the coupling parameter exceeds the predetermined value and abruptly changes, so that the control circuit board controls the cut-off of the power supply. In this embodiment, when the pressure sensing assembly I contacts the overload protection electrode, the overload protection electrode is short-circuited, and the first coil 14a is short-circuited, thereby causing the coupling parameter of the coupling circuit (the first coupling coil and the second coupling coil) to exceed the predetermined value and change abruptly, for example, the abrupt change of the resonant frequency f, so that the control circuit board controls the cut-off of the power supply to avoid any damage to the circuit and the pressure cooker.

Specifically, in this embodiment, the electrical signal includes inductance and capacitance.

Specifically, in this embodiment, the control circuit board is pre-stored with the correspondence relationship between the pressure intensity in the cooker and the coupling parameter. In this embodiment, the coupling parameter includes the resonance spectrum and the loop current of the coupling coil.

The pressure detection method described in the above embodiments can be applied to other cooking appliances in the same implementations, which will not be elaborated herein.

Therefore, the pressure cooker A has the simple and compact structure, and the connection structure and connection process of the cooker lid 30 and the cooker body 20 are simple. When the pressure cooker A is working, the pressure detection device 10 can accurately detect the air pressure in the inner cavity of the cooker body 20 of the pressure cooker A in real time, so as to achieve the overload protection of the pressure cooker A, ensure the normal operation and safe use of the pressure cooker A, and improve the user experience.

Other configurations and operations of the cooking appliance (e.g., the pressure cooker A) according to the embodiments of the present application are well known to those skilled in the art and hence will not be elaborated herein.

In the specification, it is to be understood that terms such as "central," "longitudinal," "transverse," "length," "width,"

"thickness," "upper," "lower," "front," "rear," "left," "right," "vertical," "horizontal," "top," "bottom," "inner," "outer," "clockwise," and "counterclockwise" should be construed to refer to the orientation or position relationship as then described or as shown in the drawings under discussion. These relative terms are for convenience of description and do not require that the present application must have a particular orientation or be constructed and operated in a particular orientation. Thus, these relative terms should not be constructed to limit the present application.

In the present application, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "an example," "a specific example," or "some examples," means that a particular feature, structure, material, or characteristic described in connection with the embodiment or example is included in at least one embodiment or example of the present application. Thus, the appearances of the above phrases throughout this specification do not necessarily refer to the same embodiment or example. Furthermore, the particular features, structures, materials, or characteristics may be combined in any suitable manner in one or more embodiments or examples.

Although embodiments of the present application have been shown and described, it would be appreciated by those skilled in the art that various changes, modifications, alternatives and changes can be made to the embodiments of the present application without departing from the principle and purpose of the present application.

What is claimed is:

1. A pressure detection device configured to detect pressure intensity in a sealed cavity of a cooking appliance, comprising:
    a pressure sensing assembly comprising a fixed part and a movable part, in which the movable part is configured to move relative to the fixed part when a pressure change in the sealed cavity is sensed, so as to cause a sensing parameter of the pressure sensing assembly to change; and
    a detection unit connected with the pressure sensing assembly, and configured to acquire the pressure intensity in the sealed cavity according to a current sensing parameter of the pressure sensing assembly;
    wherein the pressure sensing assembly further comprises:
    a body portion defining a pressure chamber therein, the pressure chamber having an opening facing the sealed cavity, and the body portion being provided with an air hole in communication with the pressure chamber; and
    a flexible sealing sheet disposed at an open end of the body portion to seal the open end, and configured to be deformed towards the pressure chamber when an air pressure in the sealed cavity is greater than an air pressure in the pressure chamber, in which the movable part is fixed to the flexible sealing sheet and configured to move according to deformation of the flexible sealing sheet.

2. The pressure detection device according to claim 1, wherein the sealed cavity is defined by a lid and a housing, and the detection unit comprises:
    a first coupling coil disposed in the lid; and
    a second coupling coil disposed in the housing and wirelessly coupled with the first coupling coil,
    wherein one of the second coupling coil and the first coupling coil is connected with the pressure sensing assembly.

3. The pressure detection device according to claim 2, wherein the pressure sensing assembly further comprises:
    a body portion defining a pressure chamber therein, the pressure chamber having an opening facing the sealed cavity, and the body portion being provided with an air hole in communication with the pressure chamber, wherein two air holes are provided, and the two air holes are spaced apart in a top of the body portion, wherein the fixed part comprises a fixed electrode, the movable part comprises a movable electrode, and the movable electrode is configured to move relative to the fixed electrode when the pressure change is sensed, so as to cause a capacitance value of the pressure sensing assembly to change, wherein the detection unit comprises:
    a third induction coil serving as the first coupling coil, and connected in parallel or in series with the pressure sensing assembly to constitute a second resonant circuit; and
    a second detection assembly configured to detect a resonant frequency of the second resonant circuit and acquire the pressure intensity in the sealed cavity according to the resonant frequency of the second resonant circuit.

4. The pressure detection device according to claim 3, wherein the second detection assembly comprises:
    a fourth induction coil serving as the second coupling coil, and being in mutual induction with the third induction coil, in which the fourth induction coil generates a second induction signal according to a voltage signal or a current signal of the third induction coil;
    a second detection chip connected with the fourth induction coil, and configured to detect a frequency of the second induction signal and acquire the resonant frequency of the second resonant circuit according to the frequency of the second induction signal; and
    a second protection unit, at least a part of the second protection unit being disposed to a lower surface of the fixed electrode, and the second protection unit being configured to cut off power of a device for increasing an air pressure of the sealed cavity when at least a part of the movable electrode abuts against the second protection unit.

5. The pressure detection device according to claim 4, wherein the second protection unit comprises an overload protection electrode and a second short-circuit detecting circuit, in which
    the overload protection electrode is disposed to the fixed electrode, and the movable electrode is configured to be short-circuited with the fixed electrode upon contacting the overload protection electrode;
    the second short-circuit detecting circuit is connected with the fixed electrode and the movable electrode, and generates a second protection signal when detecting that the fixed electrode and the movable electrode are short-circuited, so as to allow a pressure cooking appliance to perform a protective action according to the second protection signal, wherein the pressure sensing assembly is disposed in the lid and connected with the first coupling coil; and further comprising a controller connected with the other of the second coupling coil and the first coupling coil.

6. The pressure detection device according to claim 2, wherein the fixed part comprises a first coil, the movable part comprises a movable magnetic core, and the movable magnetic core is configured to move relative to the first coil when the pressure change is sensed, so as to cause an inductance value of the first coil to change.

7. The pressure detection device according to claim 6, wherein the first coil generates an inductance change according to a displacement change of the movable magnetic core, and causes a resonant frequency change of a sensing circuit;

the detection unit is pre-stored with an air pressure value of the sealed cavity corresponding to the resonant frequency change, and calculates the air pressure of the sealed cavity according to the resonant frequency change.

8. The pressure detection device according to claim 6, further comprising a first protection unit, at least a part of the first protection unit being disposed in a predetermined protection position in a moving direction of the movable magnetic core, and the first protection unit being configured to cut off power of a device for increasing the air pressure of the sealed cavity when a top of the movable magnetic core abuts against the first protection unit.

9. The pressure detection device according to claim 8, wherein the first protection unit comprises a first protection electrode, a second protection electrode, and a first short-circuit detecting circuit, in which the first protection electrode and the second protection electrode are disposed in the predetermined protection position in the moving direction of the movable magnetic core, and are configured to be short-circuited upon contacting the movable magnetic core;

the first short-circuit detecting circuit is connected with the first protection electrode and the second protection electrode, and configured to generate a first protection signal when detecting that the first protection electrode and the second protection electrode are short-circuited, so as to allow a pressure cooking appliance to perform a protective action according to the first protection signal.

10. The pressure detection device according to claim 6, wherein the detection unit comprises:

a first capacitor connected in parallel with the first coil to constitute a first resonant circuit;

a first induction coil serving as the first coupling coil, and connected in parallel or in series with the first coil in the first resonant circuit; and a first detection assembly configured to detect a resonant frequency of the first resonant circuit and acquire the pressure intensity in the sealed cavity according to the resonant frequency of the first resonant circuit.

11. The pressure detection device according to claim 10, wherein the first detection assembly comprises:

a second induction coil serving as the second coupling coil, and being in mutual induction with the first induction coil, in which the second induction coil generates a first induction signal according to a voltage signal or a current signal of the first induction coil; and a first detection chip connected with the second induction coil, and configured to detect a frequency of the first induction signal and acquire the resonant frequency of the first resonant circuit according to the frequency of the first induction signal.

12. The pressure detection device according to claim 1, wherein the first coil is wound around an outer periphery of the pressure chamber, wherein the movable magnetic core has an upper end located in the first coil, and a displacement distance of the upper end of the movable magnetic core in a vertical direction is smaller than an axial length of the first coil.

13. The pressure detection device according to claim 1, wherein the air hole is provided in a top of the pressure chamber, an elastic member is provided between the movable magnetic core and the top of the pressure chamber, and the elastic member has two ends connected with a top of the movable magnetic core and a top wall of the pressure chamber, respectively, wherein the elastic member is configured as a spring.

14. The pressure detection device according to claim 1, wherein the body portion is substantially formed in a columnar shape having an open lower end; the body portion has an inner wall defining the pressure chamber, and an outer wall spaced apart from the inner wall to define an accommodating cavity; the first coil is wound around the inner wall and located in the accommodating cavity, wherein a guide groove configured for upward and downward movements of the movable magnetic core is defined between an outer peripheral surface of the movable magnetic core and an inner peripheral surface of the inner wall, wherein the body portion is configured as a plastic module, and wherein the open end of the body portion has a radial dimension greater than a radial dimension of the pressure chamber.

15. A cooking appliance, comprising:
a cooker body;
a cooker lid movably provided on the cooker body, and defining, along with the cooker body, a sealed cavity; and
a pressure detection device according to claim 1, in which the pressure sensing assembly is disposed to the cooker lid, and at least a part of the detection unit is disposed to the cooker body.

16. The cooking appliance according to claim 15, wherein the cooker lid is flippably connected with the cooker body, and the detection unit is in wired connection or wireless connection with the pressure sensing assembly, wherein the cooker lid is detachably connected with the cooker body, and at least a part of the detection unit is wirelessly connected with the pressure sensing assembly.

17. The cooking appliance according to claim 15, wherein the cooker lid is provided with a columnar handle, and the columnar handle serves as the body portion, wherein the body portion is integrally formed with the cooker lid.

18. The cooking appliance according to claim 15, wherein the cooker lid is provided with a strip handle, the strip handle spans two sides of the cooker lid, and the pressure sensing assembly is disposed at a side of the strip handle.

19. The cooking appliance according to claim 15, wherein the body portion is connected with the cooker lid through a screw, wherein the open end of the body portion is provided with a connection block at two sides thereof, respectively, the connection block obliquely extends downwards and outwards, and the connection block has an upper end connected with the body portion and an outer side connected with the cooker lid, wherein a passage in communication with the open end is defined between the connection blocks; a radial dimension of a lower end of the passage is greater than a radial dimension of an upper end of the passage, and the radial dimension of the upper end of the passage is greater than a radial dimension of the open end, and wherein the cooking appliance is configured as a pressure cooker.

* * * * *